United States Patent
Mitsumori

(10) Patent No.: US 8,089,965 B2
(45) Date of Patent: Jan. 3, 2012

(54) APPARATUS AND METHOD FOR TRANSFERRING FRAMES THROUGH AGGREGATED COMMUNICATION LINKS

(75) Inventor: Yasuyuki Mitsumori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 73 days.

(21) Appl. No.: 12/318,260

(22) Filed: Dec. 23, 2008

(65) Prior Publication Data

US 2009/0225752 A1    Sep. 10, 2009

(30) Foreign Application Priority Data

Mar. 5, 2008  (JP) ................. 2008-054311

(51) Int. Cl.
*H04L 12/56* (2006.01)
*G06F 11/00* (2006.01)

(52) U.S. Cl. ........ 370/390; 370/392; 370/419; 370/432; 370/312; 370/219

(58) Field of Classification Search .............. 370/390, 370/392, 419, 218–219, 432, 395.32, 216, 370/312; 711/215–216
See application file for complete search history.

(56) References Cited

U.S. PATENT DOCUMENTS

| | | | |
|---|---|---|---|
| 6,950,432 B2 * | 9/2005 | Chen et al. | 370/390 |
| 7,333,488 B2 * | 2/2008 | Sumiyoshi | 370/390 |
| 7,474,669 B2 * | 1/2009 | Kamata et al. | 370/432 |
| 7,606,227 B2 * | 10/2009 | Fukushima et al. | 370/390 |
| 7,668,081 B2 * | 2/2010 | Hermsmeyer et al. | 370/218 |
| 2001/0037472 A1 * | 11/2001 | Li | 714/4 |
| 2003/0147387 A1 * | 8/2003 | Devi et al. | 370/390 |
| 2005/0201406 A1 * | 9/2005 | Sekine et al. | 370/432 |
| 2007/0268820 A1 * | 11/2007 | McGee et al. | 370/217 |
| 2008/0069100 A1 * | 3/2008 | Weyman et al. | 370/390 |
| 2008/0074996 A1 * | 3/2008 | Fourcand | 370/225 |
| 2008/0101362 A1 * | 5/2008 | Hu et al. | 370/390 |

OTHER PUBLICATIONS

Patent Abstracts of Japan, Publication No. 2004-349764, published Dec. 9, 2004.

* cited by examiner

*Primary Examiner* — Kwang B Yao
*Assistant Examiner* — Candal Elpenord
(74) *Attorney, Agent, or Firm* — Fujitsu Patent Center

(57) ABSTRACT

A communication apparatus that performs instant switchover from working links to backup links. The communication apparatus has a plurality of output interfaces each comprising a set of physical links constituting a different portion of a logical link. Aggregate destination management data is provided to define which physical links to use to forward frames. Upon receipt of a frame, a frame distributor consults the aggregate destination management data to select an output interface and its physical links for use in transmitting the received frame, from among the physical links constituting the logical link. When a switchover command is received, the frame distributor performs switchover from the current physical links to other physical links belonging to another output interface.

7 Claims, 23 Drawing Sheets

FIG. 6

FLOW DESTINATION MANAGEMENT TABLE — 151a

| L | DESTINATION |
|---|---|
| 0 | Y-1 |
| 1 | 1 |
| 1 | 2 |
| 1 | 3 |
| 1 | 4 |

FIG. 7

AGGREGATION MANAGEMENT TABLE 152a

| V | LAG NUMBER | SEL | NH | HT | HR | WORKING AP | BACKUP AP |
|---|---|---|---|---|---|---|---|
| 0 | 0 | 0 | 0 | 0 | 0 | 0 | 0 |
| 0 | 1 | 0 | 0 | 1 | 0 | 8 | 8 |
| 0 | 2 | 0 | 0 | 2 | 0 | 8 | 8 |
| 0 | 3 | 0 | 1 | 0 | 0 | 3 | 3 |
| 0 | 4 | 0 | 0 | 0 | 1 | 8 | 8 |

FIG. 8

AGGREGATE DESTINATION MANAGEMENT TABLE 153a

| HV | WORKING DP | BACKUP DP |
|---|---|---|
| 0 | A-0 | B-0 |
| 1 | A-1 | B-1 |
| 2 | A-2 | B-2 |
| 3 | A-3 | B-3 |
| 4 | A-4 | B-4 |
| 5 | A-5 | B-5 |
| 6 | A-6 | B-6 |
| 7 | A-7 | B-7 |

FIG. 11

254a — AGGREGATE DESTINATION STATISTICS TABLE

| Address | Value |
|---|---|
| 0x00 | 0 |
| 0x01 | 1 |
| 0x02 | 0 |
| 0x03 | 0 |
| 0x04 | 0 |
| 0x05 | 0 |
| 0x06 | 0 |
| 0x07 | 0 |
| 0x10 | 0 |
| 0x11 | 0 |
| 0x12 | 0 |
| 0x13 | 0 |
| 0x14 | 0 |
| 0x15 | 0 |
| 0x16 | 0 |
| 0x17 | 0 |

0x00–0x07: WORKING DP AREA
0x10–0x17: BACKUP DP AREA

FIG. 14

AGGREGATION MANAGEMENT TABLE 452a

| V | LAG NUMBER | SEL | NH | HT | HR | WORKING AP | BACKUP AP 1 | ... | BACKUP AP N-1 |
|---|---|---|---|---|---|---|---|---|---|
| 0 | 0 | 0 | 0 | 0 | 0 | 0 | 0 | | 0 |
| 0 | 1 | 0 | 0 | 1 | 0 | 8 | 8 | | 8 |
| 0 | 2 | 0 | 0 | 2 | 0 | 8 | 8 | | 8 |
| 0 | 3 | 0 | 1 | 0 | 0 | 3 | 3 | | 3 |
| 0 | 4 | 0 | 0 | 0 | 1 | 8 | 8 | | 8 |
| 0 | 5 | 0 | 0 | 1 | 0 | 8 | 8 | | 8 |
| 0 | 6 | 0 | 0 | 1 | 0 | 8 | 8 | | 8 |
| 0 | 7 | 0 | 0 | 1 | 0 | 8 | 8 | | 8 |

FIG. 15

AGGREGATE DESTINATION MANAGEMENT TABLE — 453a

| HV | WORKING DP | BACKUP DP 1 | BACKUP DP 2 | BACKUP DP 3 | ... | BACKUP DP N-1 |
|---|---|---|---|---|---|---|
| 0 | A-0 | B-0 | C-0 | B-0 | | Z-0 |
| 1 | A-1 | B-1 | C-1 | B-1 | | Z-1 |
| 2 | A-2 | B-2 | C-2 | B-2 | | X-2 |
| 3 | A-3 | B-3 | C-3 | B-3 | | Z-3 |
| 4 | A-4 | B-4 | C-4 | B-4 | | Z-4 |
| 5 | A-5 | B-5 | C-5 | B-5 | | Z-5 |
| 6 | A-6 | B-6 | C-6 | B-6 | | Z-6 |
| 7 | A-7 | B-7 | C-7 | B-7 | | Z-7 |

| FLOW DESTINATION MANAGEMENT TABLE | | |
|---|---|---|
| L | M | DESTI-NATION |
| 0 | 0 | Y-1 |
| 1 | 0 | 1 |
| 1 | 1 | 10 |
| 1 | 0 | 2 |
| 1 | 1 | 11 |
| 1 | 0 | 3 |
| 1 | 1 | 12 |
| ⋮ | ⋮ | ⋮ |

FIG. 21

| AGGREGATE MULTICAST MANAGEMENT TABLE | | | | | | |
|---|---|---|---|---|---|---|
| LAG NUMBER | SEL | NH | HT | HR | WORKING AP | BACKUP AP |
| 0 | 0 | 0 | 0 | 0 | 0 | 0 |
| 10 | 0 | 0 | 1 | 0 | 8 | 8 |
| 11 | 0 | 0 | 2 | 0 | 8 | 8 |
| 12 | 0 | 1 | 0 | 0 | 3 | 3 |
| 13 | 0 | 0 | 0 | 1 | 8 | 8 |
| 14 | 0 | 0 | 1 | 0 | 8 | 8 |
| 15 | 0 | 0 | 1 | 0 | 8 | 8 |
| 16 | 0 | 0 | 1 | 0 | 8 | 8 |

FIG. 22

AGGREGATE MULTICAST DESTINATION MANAGEMENT TABLE 693a

| HV | WORKING MID | BACKUP MID |
|----|-------------|------------|
| 0  | 0           | 10         |
| 1  | 1           | 11         |
| 2  | 2           | 12         |
| 3  | 3           | 13         |
| 4  | 4           | 14         |
| 5  | 5           | 15         |
| 6  | 6           | 16         |
| 7  | 7           | 17         |

| MULTICAST DESTINATION MANAGEMENT TABLE | | | | | | | |
|---|---|---|---|---|---|---|---|
| MID | A-0 | A-1 | ... | B-7 | X-1 | ... | Z-7 |
| 0 | 1 | 0 | ... | 0 | 0 | ... | 0 |
| 1 | 1 | 0 | ... | 0 | 1 | ... | 1 |
| 2 | 0 | 1 | ... | 0 | 0 | ... | 0 |
| ⋮ | ⋮ | ⋮ | ⋱ | ⋮ | ⋮ | ⋱ | ⋮ |
| 10 | 0 | 0 | ... | 0 | 0 | ... | 0 |
| 11 | 0 | 0 | ... | 1 | 1 | ... | 1 |
| 12 | 0 | 0 | ... | 1 | 0 | ... | 0 |
| ⋮ | ⋮ | ⋮ | ⋱ | ⋮ | ⋮ | ⋱ | ⋮ |

APPARATUS AND METHOD FOR TRANSFERRING FRAMES THROUGH AGGREGATED COMMUNICATION LINKS

CROSS-REFERENCE TO RELATED APPLICATIONS

This application is based upon and claims the benefits of priority from the prior Japanese Patent Application No. 2008-054311, filed on Mar. 5, 2008, the entire contents of which are incorporated herein by reference.

BACKGROUND OF THE INVENTION

1. Field of the Invention

The present invention relates to an apparatus and method for transferring frames, and more particularly to an apparatus and method for transferring frames using a logical link formed by aggregating a plurality of physical links.

2. Description of the Related Art

Most data communication networks transport data in the form of packets or frames with finite lengths. For example, transmit data is divided into frames at the data link layer before it is placed on a physical transmission medium. Those frames are delivered to their destination via intermediate network devices such as layer-2 switches. In this connection, link aggregation techniques are used to enhance the performance and quality of communication channels between network devices. Link aggregation, known as IEEE standard 802.3ad, refers to a technique to provide a single logical link by bundling two or more physical links (e.g., network cables) between two network devices.

Aggregated links provide an increased data bandwidth and thus make high-speed communication possible without using costly cables or expensive network interface cards. In recent years, many communication carriers have introduced link aggregation into their networks, but for the purpose of improving availability with link redundancy. By virtue of its simultaneous use of multiple physical links, the link aggregation prevents the communication channel from being completely disrupted even if some physical links fail.

Suppose, for example, that some physical links are selected as working links to constitute a logical link, while the remaining links are virtually blocked for the purpose of backup. The working links play the role of operating links for communication. When some of those operating links are disrupted, the system detaches the failed links from the link aggregation group and removes the virtual blocking from the backup links, thereby attaching those backup links to the link aggregation group (see, for example, Japanese Patent Application Publication No. 2004-349764). This technique uses two groups of physical links, one as working links to build a logical link and the other as backup links. In the event of a failure in the working links, the backup links are changed from unused state to usable state, while the working links are set to unused state. The link aggregation group thus continues to provide network connection.

Since a network failure leads to degradation of communication quality and system availability, it is desirable to minimize the downtime due to such failure. This is true not only in ordinary networks, but also in a network using link aggregation. Particularly, in the case of a carrier network employing link aggregation for redundancy purposes, instant switchover from failed links to normal links is required for quick recovery of communication.

SUMMARY OF THE INVENTION

In view of the foregoing, it is an object of the present invention to provide an apparatus and method for use in a communications network with a redundant link aggregation architecture, capable of instant switchover from working links to backup links upon detection of a link failure.

To accomplish the above object, the present invention provides a communication apparatus for transferring frames using a logical link formed by aggregating a plurality of physical links. This communication apparatus includes the following elements: an input interface receiving a frame; an aggregate destination management database storing aggregate destination management data indicating which physical links to use to transmit frames; a frame distributor that selects, by consulting the aggregate destination management data, a physical link of one of the output interfaces for use in transmitting the received frame from among a plurality of physical links constituting a logical link; and a plurality of output interfaces each comprising a set of physical links constituting a different portion of the logical link. The aggregate destination management data includes physical link parameters specifying the physical links of each output interface, and the frame distributor performs the above selection of a physical link from among the physical links belonging to one of the output interfaces. In response to a switchover command, the frame distributor performs switchover from the selected physical link to another physical link belonging to another one of the output interfaces.

Also, to accomplish the above object, the present invention provides another communication apparatus for transferring frames using a logical link formed by aggregating a plurality of physical links. This communication apparatus has the following elements: an input interface receiving a frame; a multicast destination management database storing multicast destination management data specifying which physical links to use to transmit frames, from among those constituting a logical link or those not involved in any logical links; and a multicast frame distributor that consults the multicast destination management data to select physical links for transmitting the frame received by the input interface.

Furthermore, to accomplish the above object, the present invention provides a method for transferring frames using a logical link formed by aggregating a plurality of physical links. This method includes the following operations: providing a plurality of output interfaces each comprising a set of physical links constituting a different portion of a logical link; providing aggregate destination management data indicating which physical links of the output interfaces to use to transmit frames; receiving a frame; selecting, based on the aggregate destination management data, a physical link of one of the output interfaces for use in transmitting the received frame, from among the plurality of physical links constituting the logical link; transmitting the received frame from the selected physical link; performing, in response a switchover command, switch over from the currently selected physical link to a physical link of another one of the output interfaces; and transmitting a newly received frame from the physical link that is activated by the switchover.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 illustrates an example data structure of a flow destination management table according to the first embodiment.

FIG. 7 illustrates an example data structure of an aggregation management table according to the first embodiment.

FIG. 8 illustrates an example data structure of an aggregate destination management table according to the first embodiment.

FIG. 11 illustrates an example data structure of an aggregate destination statistics table according to the second embodiment.

FIG. 14 illustrates an example data structure of an aggregation management table according to the fourth embodiment.

FIG. 15 illustrates an example data structure of an aggregate destination management table according to the fourth embodiment.

FIG. 20 illustrates an example data structure of a flow destination management table according to sixth embodiment.

FIG. 21 illustrates an example data structure of an aggregate multicast management table according to the sixth embodiment.

FIG. 22 illustrates an example data structure of an aggregate multicast destination management table according to the sixth embodiment.

FIG. 23 illustrates an example data structure of a multicast destination management table according to the sixth embodiment.

DESCRIPTION OF THE PREFERRED EMBODIMENTS

Figure 1:
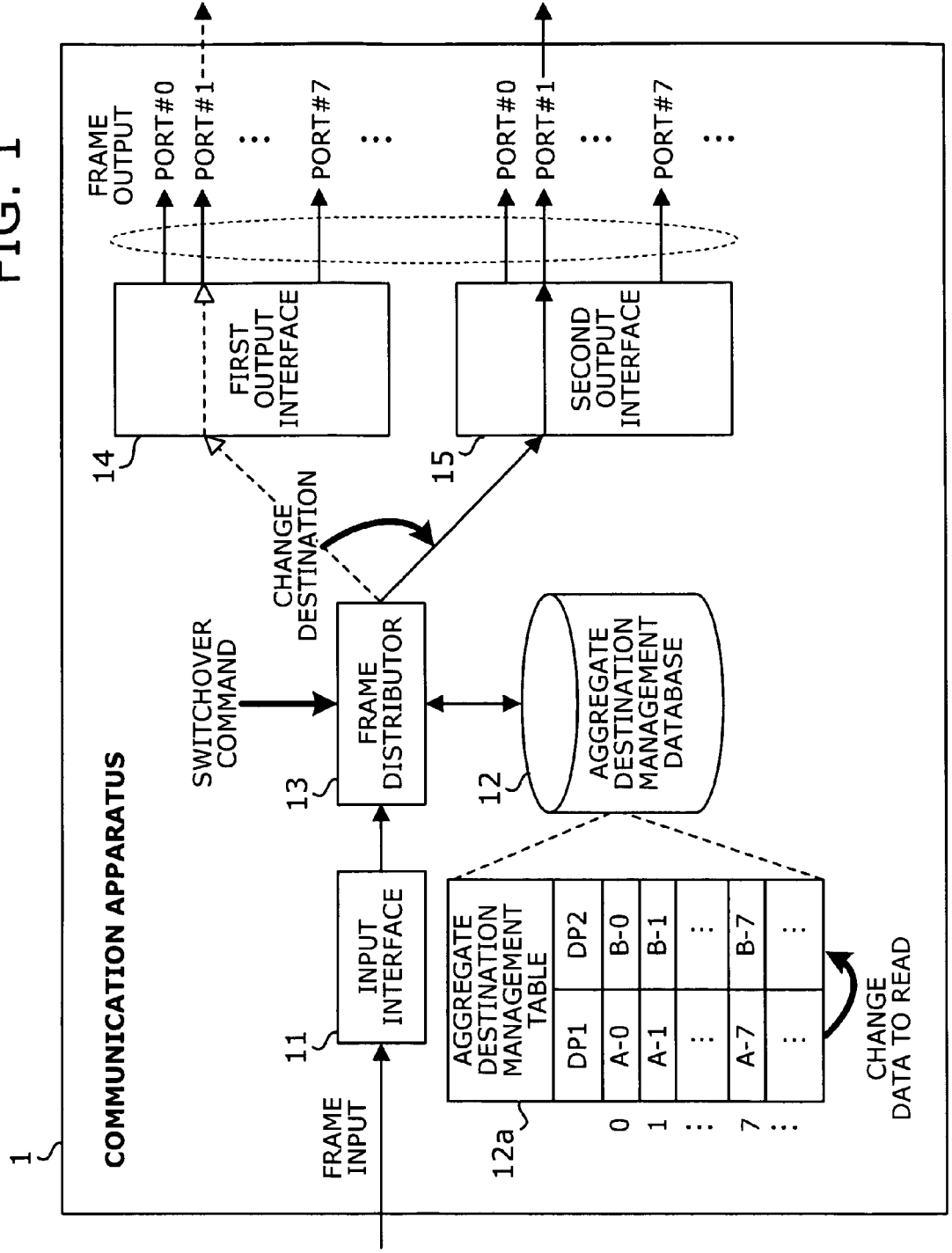
FIG. 1 provides an overview of an embodiment of the present invention.

Preferred embodiments of the present invention will be described below with reference to the accompanying drawings, wherein like reference numerals refer to like elements throughout.

FIG. 1 gives an overview of an embodiment of the present invention. The illustrated communication apparatus 1 receives frames and transfers them to its peer communication apparatus over a logical link formed by aggregating a plurality of physical links, where the link aggregation provides redundancy to the communication network. The communication apparatus 1 also performs switchover from working links to backup links in response to a switchover command. To realize these features, the communication apparatus 1 has the following elements: an input interface 11, an aggregate destination management database 12, a frame distributor 13, a first output interface 14, and a second output interface 15.

The input interface 11 receives frames destined for another communication apparatus (not shown) such as a computer or other information device. The communication apparatus 1 is supposed to forward those frames toward their intended destinations.

The aggregate destination management database 12 stores aggregate destination management data specifying to which physical links to use to transmit frames. The aggregate destination management data is actually stored in the form of an aggregate destination management table 12a. The term "physical links" refers in this context to output ports (port #0, #1, . . . ) of the first output interface 14 and second output interface 15.

The aggregate destination management data includes two sets of information. One is first physical link parameters indicating particular physical links of the first output interface 14, which are shown in the left column of the aggregate destination management table 12a. The other is second physical link parameters indicating particular physical links of the second output interface 15, which are shown in the right column of the aggregate destination management table 12a.

The frame distributor 13 consults the aggregate destination management data, i.e., the aggregate destination management table 12a in aggregate destination management database 12, to select a physical link for use in transmitting the received frame, from among those constituting a logical link.

The frame distributor 13 changes its operating mode in response to a switchover command. Initially, in a first mode, the frame distributor 13 selects a physical link belonging to the first output interface 14 by consulting the first physical link parameters. In a second mode, the frame distributor 13 selects a physical link belonging to the second output interface 15 by consulting the second physical link parameters. The transition from first mode to second mode is triggered by a switchover command, which is issued when the logical link between the communication apparatus 1 and other communication apparatus encounters a communication failure. The function of detecting such failure and producing a switchover command thereupon may be implemented in the communication apparatus 1 itself or, alternatively, in other communication apparatus.

The first output interface 14 offers a part of the physical links constituting a logical link. The second output interface 15 offers all or part of the remaining physical links constituting the logical link.

The above communication apparatus 1 operates as follows. Upon receipt of a frame at the input interface 11, the frame distributor 13 consults aggregate destination management data stored in the aggregate destination management database 12, the data indicating which physical links to use to transmit frames. The frame distributor 13 thus selects some of the physical links constituting the logical link. The first output interface 14 offers a part of the physical links constituting the logical link, while the second output interface 15 offers all or part of the remaining physical links constituting the logical link. The aggregate destination management data includes first and second physical link parameters indicating particular physical links of the first output interface 14 and second output interface 15, respectively. Those two sets of physical link parameters define two switchable operation modes of the frame distributor 13. In the first mode, the frame distributor 13 selects physical links provided by the first output interface 14 to transmit frames. In the second mode, the frame distributor 13 selects physical links provided by the second output interface 15 to transmit frames. A switchover command causes switchover from first mode to second mode.

The above-described features enable instant switchover from working links to backup links in the event of communication failure in a working link, thus enhancing availability of the communications network using a logical link formed from redundant aggregated links.

First Embodiment

Figure 2:
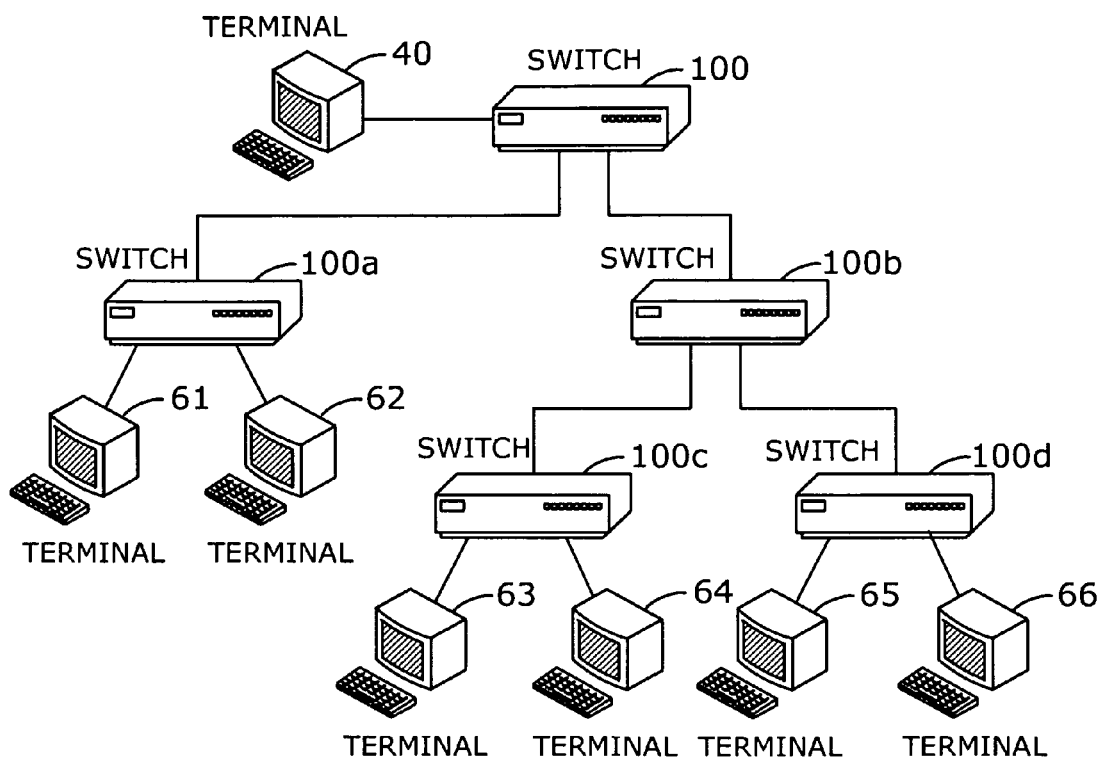
FIG. 2 illustrates an overall structure of a frame transfer system.

FIG. 2 illustrates an overall structure of a frame transfer system according to a first embodiment of the present invention. This frame transfer system includes a plurality of layer-2 switches in its data link layer to deliver data frames from one terminal device to another. Specifically, the frame transfer system of FIG. 2 includes five layer-2 switches (or simply "switches") 100, 100a, 100b, 100c, and 100d and seven terminals 40, 61, 62, 63, 64, 65, and 66. The latter six terminals 61 to 66 are user terminals, while the terminal 40 serves as an administration terminal used by an operator in charge of operation and maintenance of the switch 100. Other switches 100a, 100b, 100c, and 100d have components and functions similar to those of the switch 100.

The switch 100 is linked directly to switches 100a and 100b. The switch 100b is linked directly to switches 100c and 100d. Terminals 61 and 62 are attached to the switch 100a. Terminals 63 and 64 are attached to the switch 100c. Terminals 65 and 66 are attached to the switch 100d. Terminal 40 is attached to the switch 100. Those switch-to-switch and switch-to-terminal connections are each formed from one or more physical links (network cables).

The switches 100, 100a, 100b, 100c, and 100d deliver frames from a source terminal to a destination terminal in accordance with address information contained in each frame. Suppose, for example, that one terminal 61 has transmitted a frame with a destination address specifying another terminal 63. This frame is forwarded by the switch 100a, switch 100, switch 100b, and switch 100c in that order.

Figure 3:
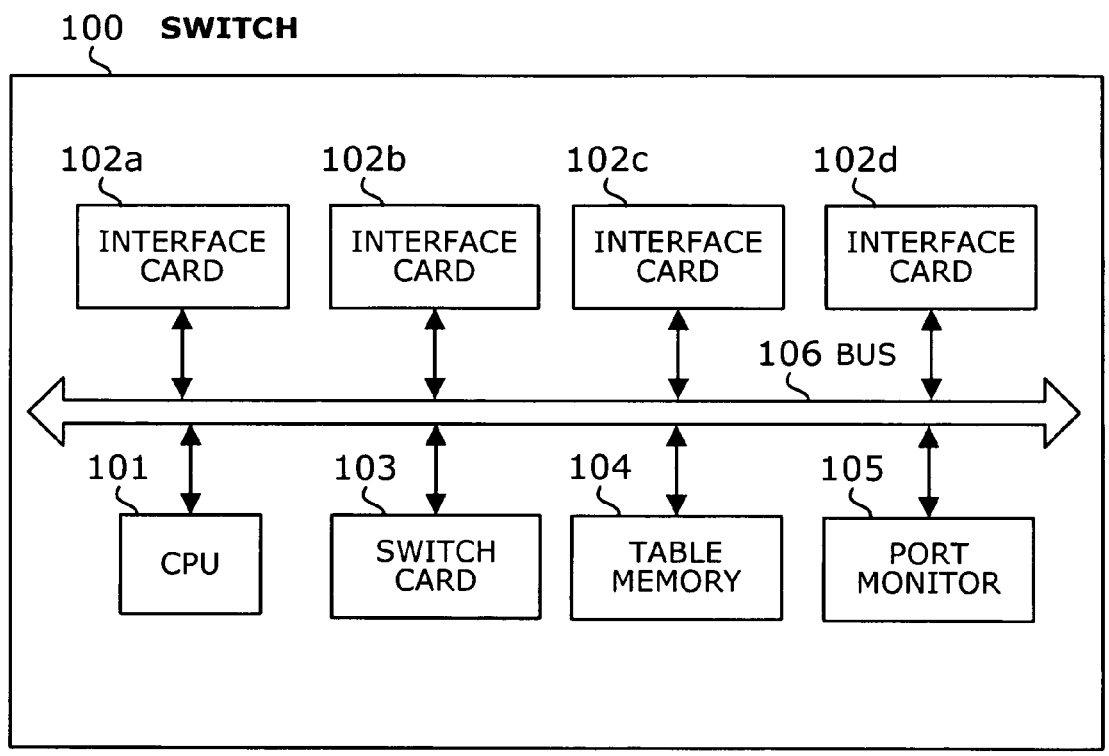
FIG. 3 illustrates a hardware configuration of a switch.

FIG. 3 illustrates a hardware configuration of a switch. While FIG. 3 illustrates the switch 100 alone, the other switches 100a, 100b, 100c, and 100d may have the same internal structure. Specifically, the illustrated switch 100 includes the following components: a CPU 101, interface cards 102a, 102b, 102c, and 102d, a switch card 103, a table memory 104, a port monitor 105, and a bus 106.

The central processing unit (CPU) 101 controls the entire switch 100 by executing various programs stored in memory (not shown), as well as manipulating data stored in that memory. The CPU 101 receives commands from the administration terminal 40 through a communication interface (not shown) and returns a response to the administration terminal 40.

The table memory 104 stores a plurality of tables. One table is used to manage logical link configuration. Another table is used to determine which portion of the logical link to use for sending frames, and yet another table records the result of such determination.

The bus 106 interconnects the CPU 101, interface cards 102a, 102b, 102c, and 102d, switch card 103, table memory 104, and port monitor 105. Each interface card 102a, 102b, 102c, and 102d has a plurality of (e.g., eight) communication ports, each of which accommodates one physical link. Those interface cards 102a, 102b, 102c, and 102d watch their respective ports to receive frames and send the received frames to the switch card 103. To provide for simultaneous arrival of frames at two or more ports, the interface cards 102a, 102b, 102c, and 102d have an internal buffer as temporary storage for those received frames.

The switch card 103 has a learning cache table (not shown) to store records of the source address of each frame received in the past, together with the identifiers of ports or logical link through which those frames were received. This learning cache table is updated by the switch card 103 whenever it is required.

Each time a frame is received from the interface cards 102a, 102b, 102c, 102d, the switch card 103 consults the above learning table to determine where to direct the received frame. In the case where the frame is to be directed to a logical link, the switch card 103 consults one of the tables stored in the table memory 104 to determine which specific interface card to use, and which port of that interface card to use, so as to transfer the frame. The switch card 103 then forwards the frame to the determined interface card. Upon receipt of such a frame, the interface cards 102a, 102b, 102c, and 102d send out the frame toward its destination via the determined port.

The port monitor 105 watches each port of the interface cards 102a, 102b, 102c, and 102d. When a failure (or recovery therefrom) of a specific physical link is observed at its corresponding port of the interface cards 102a, 102b, 102c, and 102d, the port monitor 105 notifies the CPU 101 of that fact.

Figure 4:
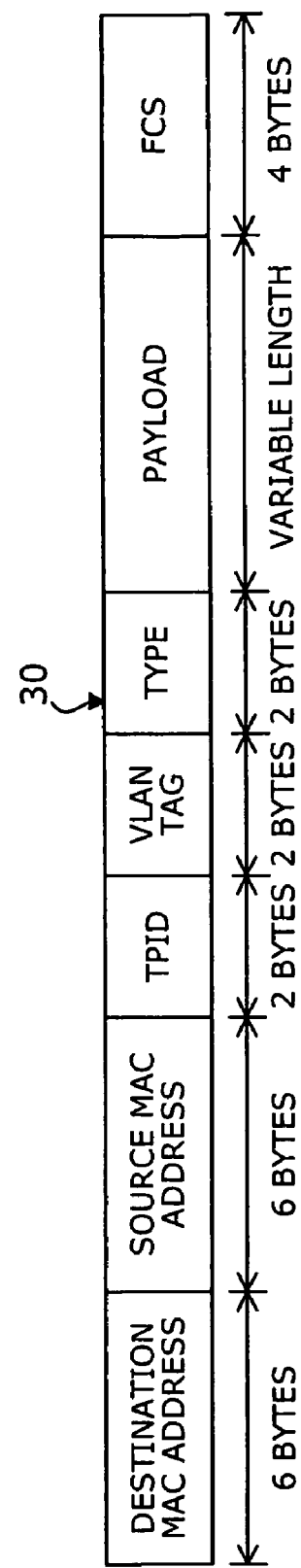
FIG. 4 illustrates an example data structure of frames.

FIG. 4 illustrates an example data structure of frames transferred to/from other switches 100a and 100b through the ports of interface cards 102a, 102b, 102c, and 102d. As can be seen from FIG. 4, this frame 30 is formed from the following data fields: destination media access control (MAC) address, source MAC address, tag protocol identifier (TPID), virtual local area network (VLAN) tag, type, payload, and frame check sequence (FCS).

Destination MAC address field uniquely identifies the communication interface of the destination terminal. Source MAC address field uniquely identifies the communication interface of the source terminal. TPID field indicates type of the frame (e.g., whether it is a VLAN frame or an ordinary frame). VLAN tag field gives a unique number assigned to each logical network for use in dividing a network into a plurality of logical networks. Type field is used to specify which protocol to use. Payload field carries data to be transferred. For example, an IP packet is partitioned into a plurality of fixed-length data segments, such that they will fit into the payload field. FCS field contains an error detection code used to check the integrity of a received frame.

It should be noted that the frame structure of FIG. 4 is only an example. There are various frame structures, depending on the implementations of network systems. VLAN tag may be omitted in some cases. Other header information may be added in other cases.

Figure 5:
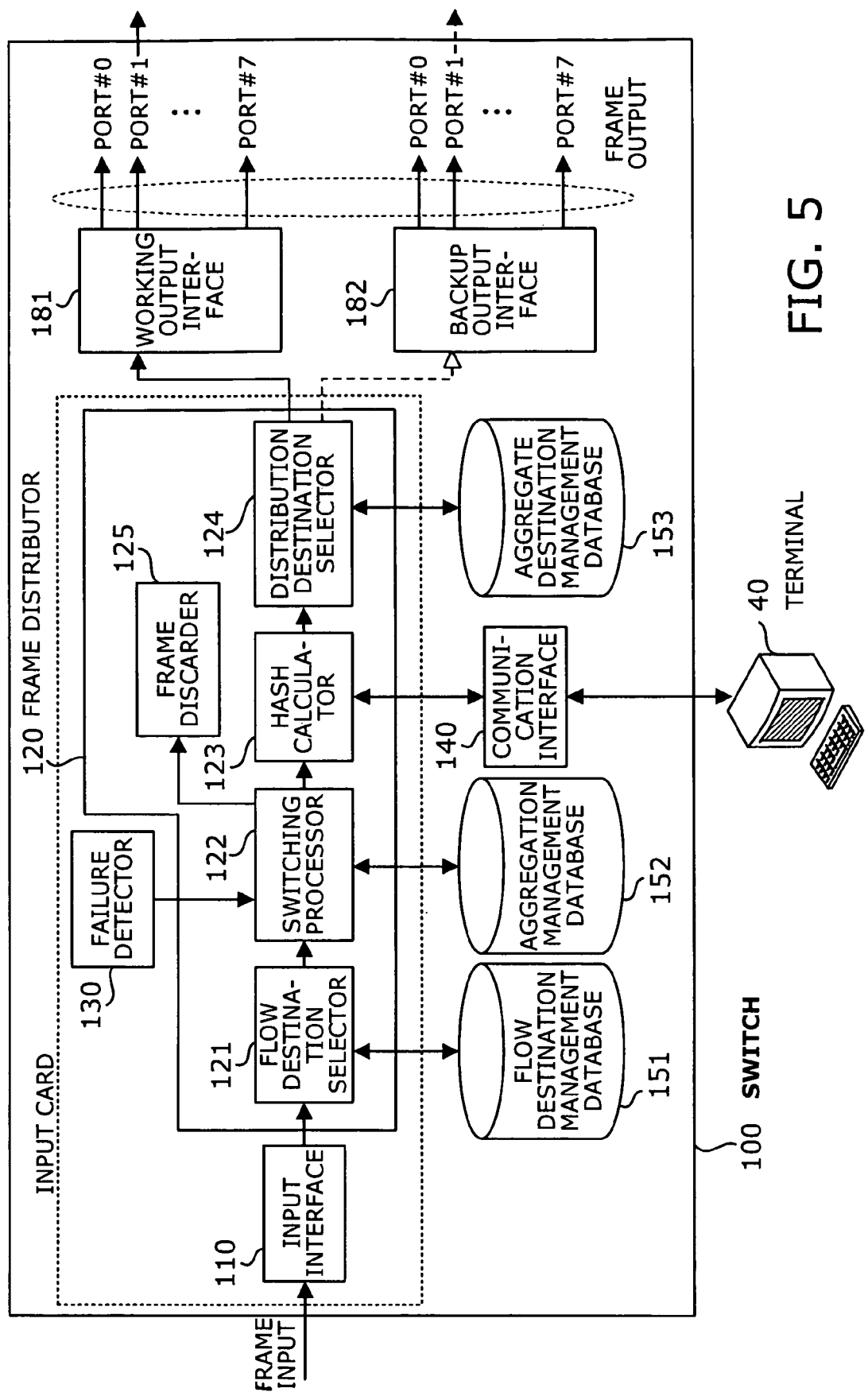
FIG. 5 is a functional block diagram of a switch according to a first embodiment of the present invention.

FIG. 5 is a functional block diagram of a switch according to the first embodiment of the present invention. While FIG. 5 illustrates a switch 100 alone, the other switches 100a, 100b, 100c, and 100d may have the same modular structure.

The illustrated switch 100 serves in a communications network that uses link aggregation for redundancy purposes. According to the first embodiment, this switch 100 performs switchover from working links to backup links in response to a switchover command. To achieve this, the switch 100 has the following elements: an input interface 110, a frame distributor 120, a failure detector 130, a communication interface 140, a flow destination management database 151, an aggregation management database 152, an aggregate destination management database 153, a working output interface 181, and a backup output interface 182. Further, the frame distributor 120 is formed from the following elements: a flow destination selector 121, a switching processor 122, a hash calculator 123, a distribution destination selector 124, and a frame discarder 125.

The term "working output interface" refers to an output interface that is supposed to be activated as an operating output interface in its default state and during normal conditions. By contrast, the term "backup output interface" refers to an output interface that is supposed to be on standby in its default state and during normal conditions.

The input interface 110 receives frames that arrive at the switch 100 of the present embodiment and will be forwarded to its peer switches 100a, 100b, 100c, and 100d or other communication devices including terminals. The frame distributor 120 selects physical links for use in transmitting the received frames, from among the physical links constituting a logical link. The frame distributor 120 makes this selection by consulting aggregate destination management data, or an aggregate destination management table 153a, stored in the aggregate destination management database 153.

The frame distributor 120 switches its selection of physical links in response to a switchover command. In "working" mode, the frame distributor 120 selects physical links belonging to the working output interface 181 by consulting working physical link parameters. In "backup" mode, the frame distributor 120 selects physical links belonging to the backup output interface 182 by consulting backup physical link parameters.

The failure detector 130 detects a failure in the logical link between the switch 100 and other switch. If a failure is found, the failure detector 130 sends a switchover command to the switching processor 122 in the frame distributor 120. Under the switching control of the frame distributor 120, the working output interface 181 outputs frames from its physical links, or the backup output interface 182 outputs frames from its physical links.

The frame distributor 120 performs switchover from working links to backup links, based on the number of physical links available for use. Specifically, the frame distributor 120 performs this switchover in the case where the number of physical links identified by active physical link parameters of the working output interface 181 is insufficient with respect to a required bandwidth specified by a bandwidth parameter. Outgoing frames transmitted from the switch 100 need a specific amount of network bandwidth depending on their destinations. This bandwidth requirement is specified by bandwidth parameters stored in the switch 100's memory (not shown in FIG. 5).

The flow destination selector 121 determines where to direct each received frame, by consulting flow destination management data stored in the flow destination management database 151. Specifically, this determination selects either a physical link belonging to a logical link or one of other physical links that are independent of, or not involved in, any logical links (the latter group not shown in FIG. 5).

The flow destination selector 121 determines the destination of each received frame, based on its destination MAC address field (FIG. 4) and a flow destination management table 151a (details described later in FIG. 6). Specifically, the flow destination selector 121 extracts a destination MAC address from the received frame and looks up the flow destination management table 151a. Here the extracted MAC address is used to index into the flow destination management table 151a. The flow destination selector 121 thus obtains destination information from the table's destination field corresponding to the extracted MAC address.

As will be described later in FIG. 6, the flow destination management table 151a has "L" and "DESTINATION" fields corresponding to different destination MAC address values of frames. For the frames to be transmitted via a logical link (or a link aggregation group, LAG), the L field is set to one to indicate that its corresponding DESTINATION field contains a logical link identifier. Following this convention, the flow destination selector 121 selects a specified logical link as the destination of a received frame if the L field corresponding to the frame's destination MAC address contains a value of one. Note that the flow destination management table 151a may be indexed by VLAN tag values (see FIG. 4), instead of destination MAC address.

Since both the destination MAC address and VLAN tag have many digits, the flow destination management table 151a would consume a large memory space if those values were used as index values. It is therefore preferable to use content addressable memory (CAM), rather than standard static random access memory (SRAM) or dynamic random access memory (DRAM), for the flow destination management database 151. The use of CAM for this purpose means that the flow destination selector 121 looks up the flow destination management table 151a by using a destination MAC address or VLAN tag, not as an index, but as a search key. The CAM-based flow destination management table 151a eliminates the need for allocating a large memory area to cover the entire range of destination MAC address or VLAN tag, thus saving memory resources.

The switching processor 122, responsive to a switchover command from the failure detector 130, changes some entries of aggregation management data from those indicating working state to those indicating backup state. Based on the modified aggregation management data, the distribution destination selector 124 selects output physical links from among those constituting the working output interface 181 and backup output interface 182.

The switching processor 122 also activates the hash calculator 123 to calculate a hash from a received frame if so specified in the aggregation management data. More specifically, the switching processor 122 first extracts a frame segment out of the received frame according to a predefined frame segment designator, and then it passes the extracted segment to the hash calculator 123 to calculate a hash therefrom according to hash algorithm parameters specifying what to calculate and how. The switching processor 122 may find a hash disable flag set. If this is the case, the switching processor 122 selects an output physical link without activating the hash calculator 123.

The term "frame segment" refers to a part of a frame specified by a frame segment designator. For example, the frame segment may be an address field of a frame that specifies the source terminal (or source group of terminals) or destination terminal (or destination group of terminals). More specifically, the following field of frames may be extracted as a frame segment: source MAC address, destination MAC address, source Internet Protocol (IP) address, destination IP address, and VLAN tag. The frame segment designator specifies the position and range of such an address field within a frame.

The present embodiment uses a hash value to associate a frame segment (or address field) with a particular physical link. Specifically, a hash value calculated from a specific address field corresponds uniquely to a port number representing a specific physical link. The hash calculator 123 calculates a hash of a given frame segment by subjecting that frame segment to a hash function that produces as many different values as the number of physical links of the working output interface 181 and backup output interface 182. The present embodiment assumes that the hash calculator 123 divides a given frame segment by the number of currently available ports of the output logical link and outputs the remainder as a hash value. When the output logical link has N ports (e.g., N=8), the remainder takes a value ranging from 0 to N−1 (e.g., 0 to 7 in the case of N=8). Optionally the hash calculator 123 may be configured to use a generator polynomial as the divisor.

The distribution destination selector 124 determines to which physical link to direct frames, based on the decision made by the flow destination selector 121. Specifically, the distribution destination selector 124 performs switchover from working state to backup state according to the aggregation management data. In addition, the distribution destination selector 124 consults aggregate destination management data to select an output physical link, based on a hash value calculated by the hash calculator 123.

The frame discarder 125 discards frames if so specified by a frame discard indicator in the aggregate destination management data. It is therefore possible to control the destination of output frames such that only a particular device can receive frames, or such that a particular device is prevented from receiving frames. This function of the frame discarder 125 is useful when testing the switch 100 and another device connected thereto.

The failure detector 130 detects a failure of physical links of the working output interface 181 and outputs a switchover command upon detection of such a failure.

The flow destination management database 151 stores flow destination management data that indicates which physical link to use to transmit frames. Specifically, the flow destination management data specifies either a physical link that belongs to a logical link or a physical link that does not belong to any logical link.

The aggregation management database 152 stores aggregation management data that indicates whether the physical link used to transmit frames should be those of the working output interface 181 or those of the backup output interface 182.

The aggregation management data also includes several configuration parameters related to hash calculation that the hash calculator 123 performs, which are:

Frame segment designator that specifies a frame segment (used by the switching processor 122 to determine which physical link to use to transmit frames)

Hash algorithm parameters that specify how to calculate a hash

The number of active physical links in each of the working output interface 181 and backup output interface 182

Hash disable flag indicating that no hash calculation is required

The aggregation management data further includes a frame discard indicator that indicates whether to discard frames.

The aggregate destination management database 153 contains aggregate destination management data indicating physical links to which frames are directed. In the aggregate destination management database 153, this aggregate destination management data is stored in the form of aggregate destination management tables 153a and 153b (details described later in FIGS. 8 and 9).

The aggregate destination management data includes working physical link parameters of physical links belonging to the working output interface 181. Also included in the aggregate destination management data are backup physical link parameters of physical links belonging to the backup output interface 182. The term "physical links" refers in this context to the ports of the working output interface 181 and backup output interface 182 (e.g., port #0 to port #7).

Yet another data included in the aggregate destination management data is a collection of hash values to be produced by the hash calculator 123. Those hash values are associated with physical links identified by working physical link parameters, as well as with those identified by backup physical link parameters.

The aggregate destination management database 153 is implemented using a dual port memory. The working and backup physical link parameters in the aggregate destination management database 153 are accessed using an index. A part of this index corresponds to individual output interfaces (i.e., working output interface 181 and backup output interface 182), while another part of the index corresponds to individual physical links.

The working output interface 181 is formed from a subset of the physical links constituting a logical link. The backup output interface 182, on the other hand, is formed from the whole or part of the remaining physical links constituting a logical link. The working output interface 181 has as many physical links as the backup output interface 182 has (e.g., eight links). The present embodiment assumes that the working output interface 181 and backup output interface 182 have eight ports each, thus providing 16 ports to form a single logical link.

The terminal 40 is attached to the switch 100, so that information obtained from the switch 100 can be viewed on a monitor screen (not shown). The switch 100 contains a communication interface 140 to communicate with the terminal 40. This communication permits the terminal 40 to obtain aggregate destination management data and aggregate destination statistics and output the received information on its monitor screen (not shown).

The switch 100 has a plurality of interface cards as shown in FIG. 3. In this example, four interface cards 102a, 102b, 102c, and 102d are installed in the switch 100. All those interface cards are equivalent in their communication functions and thus capable of both receiving and sending frames. The present embodiment assumes, however, that one interface card 102a serves as an input card to receive frames while other two interface cards 102b and 102c serve as output cards to send frames, for illustrative purposes. The input card offers functions corresponding to the above-described input interface 110, frame distributor 120, and failure detector 130, whereas the two output cards function as the working output interface 181 and backup output interface 182, respectively. The switch 100 forwards received frames to other switches or terminals using such input and output cards.

The switch 100 may be configured to handle two or more logical links by using output interface cards (i.e., working output interface 181 and backup output interface 182) having multiple physical links. If this is the case, the frame distributor 120 allocates, for example, one output card and its physical links to each different logical link. The frame distributor 120 may allow more flexible mapping between the physical links and the logical links. With this programmable feature of the frame distributor 120, the switch 100 can provide one or more logical links by variously bundling a plurality of physical links offered, no matter whether those physical links are offered by a single output card or multiple output cards.

The present embodiment employs a plurality of multiple-port interface cards (e.g., interface cards 102a, 102b, 102c, 102d) to form each logical link from aggregated physical links. Each port of the interface cards serves as part of individual physical links. In other words, a logical link is formed from a plurality of interfaces having a plurality of ports.

For example, the present embodiment uses two N-port interface cards (e.g., N=8) to organize a single logical link with 2 by N ports. For the purpose of redundancy in communication interface, N ports of one interface card are activated as working ports for communication, while N ports of the other interface card are kept in standby state. This setup is referred to herein as N:N link configuration. The two figures separated by a colon represent the numbers of ports (or physical links) assigned the working and backup roles, respectively.

From the user's viewpoint, the above logical link appears to have N active ports for communication. In the event of a failure in the working interface card, the switch 100 performs a switchover of interface cards by activating N ports of the backup interface card while setting the ports of the failed working interface card in inactive state. This control enables the logical link to keep operating with N ports even in the case of failure. Besides, it is possible to prevent the ongoing communication from being affected by replacement of the failed interface card.

FIG. 6 illustrates an example data structure of a flow destination management table according to the first embodiment. This flow destination management table 151*a* is stored in the foregoing table memory 104 (FIG. 3), which serves as the flow destination management database 151. The flow destination management table 151*a* is used to determine whether the destination link of each given frame is part of a logical link. For this purpose, the flow destination management table 151*a* has "L" and "DESTINATION" fields. The L field represents a logical link property of destination port of a frame. The DESTINATION field indicates where to direct the frame. The field values arranged in a row constitute a single set of associated parameters.

More specifically, the L field contains a value representing whether the destination port of a frame belongs to a logical link, which is zero for non-logical-link ports or one for logical link ports. The DESTINATION field, on the other hand, contains a specific LAG number (described later in FIG. 7) when the destination port is a logical link port. When the destination port of a frame is not a logical link port, the DESTINATION field contains a combination of destination card name and port number to specify which port of which interface card is to transmit the frame.

The above-described flow destination management table 151*a* is saved in the table memory 104 (FIG. 3) according to console commands given by an operator who manages the switch 100.

FIG. 7 illustrates an example data structure of an aggregation management table according to the first embodiment. The illustrated aggregation management table 152*a* is stored in the foregoing table memory 104 (FIG. 3), which serves as the aggregation management database 152. The aggregation management table 152*a* is used to determine which logical link to use to transfer frames. For this purpose, the aggregation management table 152*a* has the following data fields:

V (valid) field
LAG NUMBER field
SEL (selector) field
NH (no hash) field
HT (hash target) field
HR (hash rule) field
WORKING AP (active port) field
BACKUP AP field The field values arranged in a row constitute a single set of associated parameters.

The V field indicates whether each link of the switch 100 is valid. Specifically, V=0 indicates that the corresponding link is valid, while V=1 indicates that the corresponding link is invalid due to some failure in the switch, interface, or link aggregation.

The LAG NUMBER field contains an LAG number used to distribute frames to aggregated links. LAG numbers are used to extract a specific pattern of frame distribution using link aggregation from among those predefined in the aggregation management table 152*a*.

The SEL field indicates whether the output logical link of frames is a working link or a backup link. Specifically, SEL=0 indicates that the frames is sent over a working logical link. The SEL field values is changed from SEL=0 to SEL=1 in the event of a failure in the working logical link. SEL=1 means that the failed working logical link is to be replaced with a backup logical link to continue frame transmission.

The NH field specifies whether to calculate hashes for frame distribution. Specifically, NH=0 enables hash calculation, while NH=1 disables hash calculation.

The HT field specifies which part of a frame is subjected to hash calculation if it is enabled (i.e., NH=0). Specifically, HT=0 means that a hash is calculated from MAC address field of a given frame. HT=1 means that a hash is calculated from VLAN ID field of a given frame. HT=2 means that a hash is calculated from IP address field of a given frame.

The HR field specifies a specific algorithm of hash calculation. Specifically, HR=0 indicates that a hash is obtained as the remainder of division of the hash target value by the number of active ports (described later). HR=1 indicates that a hash is obtained as the remainder of division of the hash target value by a predefined generator polynomial.

Figure 9:
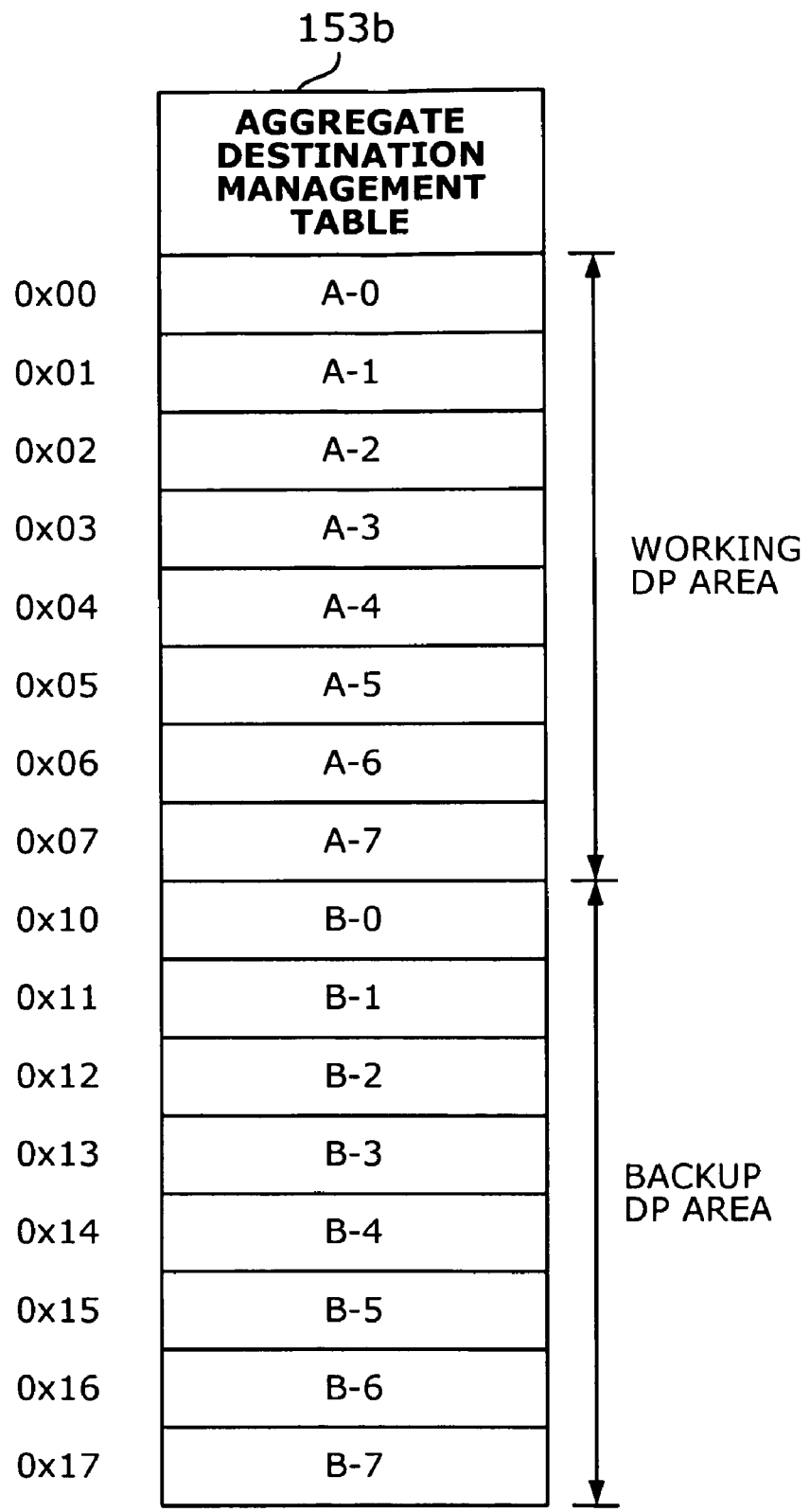
FIG. 9 illustrates an example data structure of an aggregate destination management table according to a variation of the first embodiment.

The WORKING AP field indicates the number of active ports available for use in the working logical link. When the hash calculation is disabled (i.e., NH=1), the WORKING AP field contains a value that specifies an output port of the working logical link. Basically the WORKING AP field gives the number of active ports available at that moment for use in the working logical link. In the case of NH=1, the WORKING AP field contains the HV field value of a corresponding entry of the aggregate destination management table 153*a* (FIG. 8). As will be described later, the aggregate destination management table 153*a* is used to determine which port of a working logical link to select to transfer frames. The HV field value is equal to the index (or address) of a corresponding entry of the aggregate destination management table 153*b* (FIG. 9).

The BACKUP AP field indicates the number of active ports available for use in the backup logical link. When the hash calculation is disabled (i.e., NH=1), the BACKUP AP field contains a value that specifies an output port of the backup logical link. Basically the BACKUP AP field gives the number of active ports available at that moment for use in the backup logical link. In the case of NH=1, the BACKUP AP field contains the HV field value of a corresponding entry of the aggregate destination management table 153*a* (FIG. 8). This HV field value is equal to the index (or address) of a corresponding entry of the aggregate destination management table 153*b* (FIG. 9).

See, for example, the third-to-the-top entry of the aggregation management table 152*a*. This table entry has an NH field value of zero, meaning that the hash calculator 123 calculates a hash for use in selecting a logical link. The WORKING AP field of this entry is set to eight, which indicates the number of active ports currently available for use in the working logical link. When the available ports are reduced due to a physical link failure, the failure detector 130 rewrites this WORKING AP field to reduce its value.

Then see the fourth-to-the-top entry of the aggregation management table 152*a*. This table entry has its NH field set to one, meaning that the hash calculator 123 is disabled. In this case, the aggregation management database 152 directly specifies which physical port to use. Specifically, the WORKING AP field contains a value of three, which designates a specific physical link port belonging to the current working logical link. This applies not only to WORKING AP field, but also to BACKUP AP field.

The above-described aggregation management table 152a is saved in the table memory 104 according to console commands given by an operator who manages the switch 100. Some values in the aggregation management table 152a may vary as the number of active ports of the working and backup logical links changes. For example, when a logical link is switched from the working output interface 181 to the backup output interface 182 due to a problem with a working port, the SEL field of the aggregation management table 152a is changed from zero to one. The WORKING AP field is also changed from the number of active ports (e.g., 7) at the time of the failure to the number of backup ports (e.g., 8) that have just been put into operation.

According to the present embodiment, the aggregation management table 152a has both working and backup AP fields to set the number of active ports for each of the working output interface 181 and backup output interface 182. This eliminates the need for rewriting AP fields when changing from working links to backup links.

FIG. 8 illustrates an example data structure of an aggregate destination management table according to the first embodiment. The illustrated aggregate destination management table 153a is stored in the table memory 104 (FIG. 3), which serves as the foregoing aggregate destination management database 153. The aggregate destination management table 153a is used to determine which destination port of a logical link to select to transfer frames. For this purpose, the aggregate destination management table 153a has the following data fields:
HV (hash value) field
WORKING DP (destination port) field
BACKUP DP field The field values arranged in a row constitute a single set of associated parameters.

The HV field contains values that associates hash values identifying each frame with their corresponding output ports. The WORKING DP field contains unique identifiers of each destination port of a working logical link. The BACKUP DP field contains unique identifiers of each destination port of a backup logical link. The aggregate destination management table 153a is saved in the table memory 104 according to console commands given by an operator who manages the switch 100.

As can be seen from the above description, the first embodiment enables instant switchover from working links to backup links in the event of failure. This switchover is accomplished by simply modifying the SEL field of the aggregation management table 152a.

The aggregation management table 152a includes HT, NH, and HR fields to manage hash calculation. The HT field specifies a frame segment subjected to the hash calculator 123. This HT-field can be programmed individually for each logical link, thus enhancing flexibility of frame distribution. The NH field selects whether to enable or disable hash calculation. This option allows frames to be directed to a single destination while skipping hash calculation. The HR field permits a hash calculation method to be specified for each link aggregation group.

The aggregation management table 152a also offers an independent data field indicating the current number of active ports for each of the working and backup link groups. Even if one of those ports encounters a problem, the current logical link selection can be maintained as long as the current number of active ports satisfies the bandwidth requirement of the link. Switchover of logical links would not take place until the current logical link is unable to provide the required bandwidth.

The present embodiment employs a frame discarder 125 to discard frames in the case where a failure extends to every output interface and every port constituting a logical link, or in the case where the function of the switch 100 itself is disrupted. This feature prevents frames from being transmitted meaninglessly in such situations, besides reducing workload of frame processing within the switch.

The switch 100 outputs information describing its operating status to an external terminal 40 through a communication interface 140. This feature permits network operators and system operators to monitor and manage the operation of logical links, thus contributing to reliable communication service using the switch 100.

Variation of First Embodiment

This section describes a variation of the foregoing first embodiment of the present invention. This variation shares many elements with the first embodiment. The following description will focus on their differences, while affixing like reference numerals to like elements.

Briefly, the switch of this variation employs an aggregate destination management table 153b in which the arrays of working DPs and backup DPs are arranged in different index spaces, as opposed to the common index space as in the original first embodiment.

One arrangement of working DPs and backup DPs in an aggregate destination management table is to place them in adjacent two columns, such that both DPs can be looked up by using a common index. While this arrangement saves storage space, the table memory may experience an access conflict. When the switch is operating with a working interface, the aggregate destination management table receives constant access to handle incoming frames. If, in this situation, a configuration frame arrives to change some backup DP definitions or other configuration parameters, then the resulting table access may conflict with those of ordinary incoming packets. To handle such simultaneous access properly, it is necessary to implement an arbitration function into the circuit. This brings more complexity to the circuit design and thus leads to an increased equipment cost.

FIG. 9 illustrates an example data structure of an aggregate destination management table according to a variation of the first embodiment. This modified version of the first embodiment uses an aggregate destination management table 153b that arranges working DPs and backup DPs in two different index spaces. Each area is indexed by a bit string obtained by concatenating an SEL field value of the aggregation management table 152a (FIG. 7) and a hash value calculated according to that table.

The aggregate destination management table 153b is stored in a dual port memory providing two independent data ports. Port #7 of the backup output interface 182 is found as the bottommost record in the backup DP area of the illustrated aggregate destination management table 153b. This record is indexed by a value "0x17" in hexadecimal notation, which is obtained by concatenating an SEL field value "1" and a DP address value "7." It is this value that associates, in the aggregate destination management table 153b, the hash value of a frame with the output port used to transmit it. The abovementioned dual port memory allows writing data into one port while reading data from the other port, thus enabling high-speed parallel read/write operation. Since the working DPs and backup DPs are arranged in separate memory areas, the aggregate destination management table 153a takes advantage of a dual port memory, making it possible to set up or reconfigure a backup interface in standby state while operating the working interface to transfer frames, without causing access conflicts.

The aggregate destination management table 153b of FIG. 9 is stored in the table memory 104 (FIG. 3). Similar to another aggregate destination management table 153a shown in FIG. 8, this aggregate destination management table 153b is used to determine which destination port of a logical link to select to transfer frames. The aggregate destination management table 153b stores a list of identifiers that uniquely identify each destination port belonging to a working or backup logical link, the list being indexed by hash values of frames. The aggregate destination management table 153b is saved in the table memory 104 according to console commands given by an operator who manages the switch 100.

As can be seen from the above description, this variation of the first embodiment offers an aggregate destination management table 153b in which working DPs and backup DPs are arranged in separate memory areas. This design makes it possible to set up or reconfigure a backup interface in standby state while allowing the working interface to transfer frames, without causing access conflicts.

Second Embodiment

This section describes a second embodiment of the present invention. The second embodiment shares several elements with the first embodiment. The following description will focus on their differences, while affixing like reference numerals to like elements.

Briefly, the second embodiment is different from the first embodiment in that the frame distributor 220 has a statistical data recorder 226 that collects statistical data of frames transmitted from each physical link and saves their summary in an aggregate destination statistics database 254. Referring now to the block diagram of FIG. 10, the following will describe a frame distributor 220 according to the second embodiment.

The illustrated frame distributor 220 has, among others, the following elements: a flow destination selector 121, a switching processor 122, a hash calculator 123, a distribution destination selector 124, and a frame discarder 125. In addition, the frame distributor 220 has a statistical data recorder 226 to collect and summarize the statistics of frames transmitted from each physical link.

Figure 10:
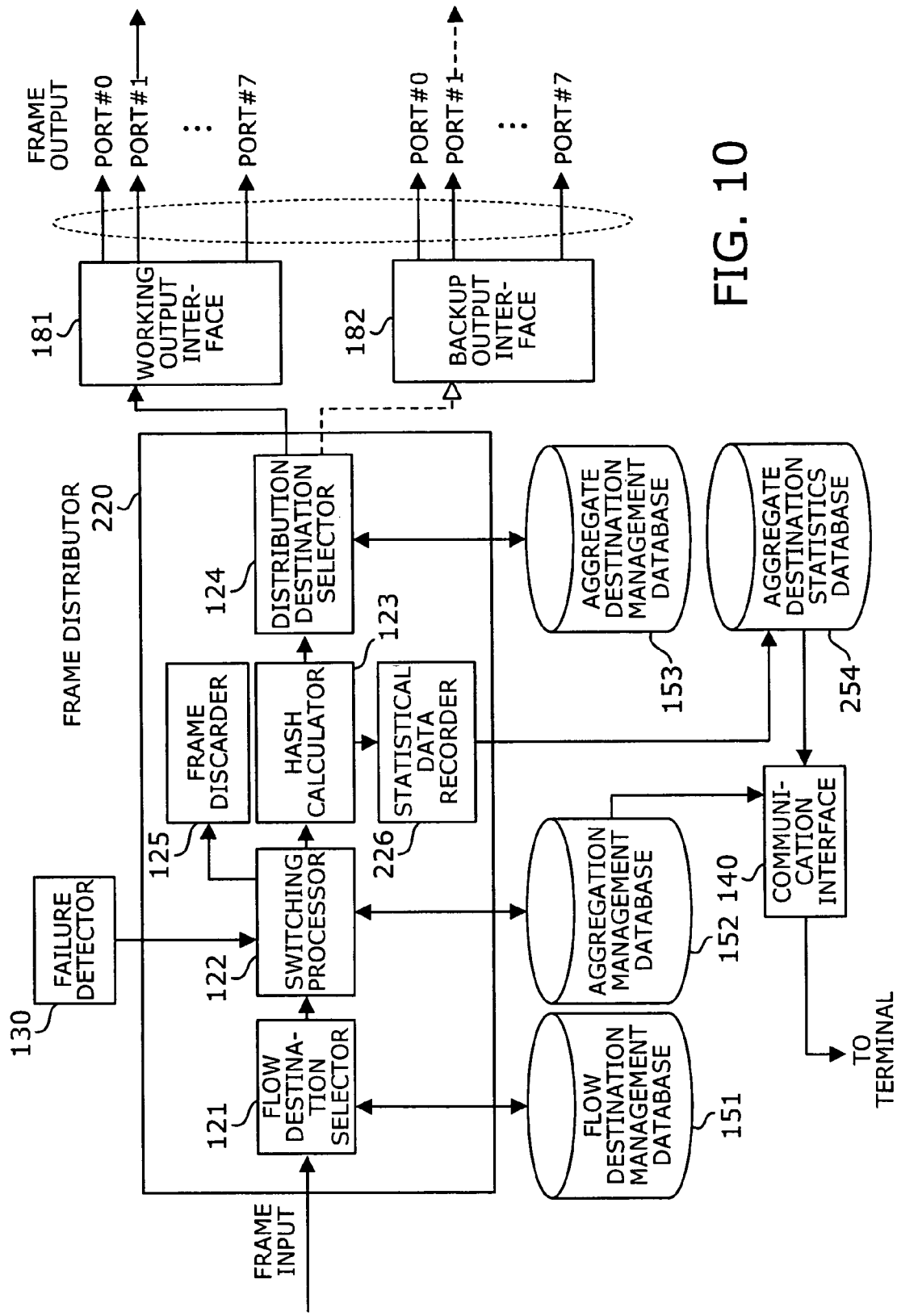
FIG. 10 is a functional block diagram of a frame distributor according to a second embodiment of the present invention.

While FIG. 10 does not explicitly show, the second embodiment includes a switch having functions similar to those of the switch 100 discussed in the first embodiment. That is, the switch used in the second embodiment includes the following elements: an input interface (not shown), a frame distributor 220 (already mentioned above), a failure detector 130, a communication interface 140, a flow destination management database 151, an aggregation management database 152, an aggregate destination management database 153, a working output interface 181, and a backup output interface 182. In addition to those elements, the switch has an aggregate destination statistics database 254 to store statistical records describing how many frames have been sent out of each physical link.

The input interface (not shown in FIG. 10) operates similarly to the input interface 110 of the first embodiment. That is, it receives frames that arrive at the switch of the present embodiment and are supposed to be forwarded to its peer switches or other communication devices including terminals.

The frame distributor 220 operates similarly to the frame distributor 120 of the first embodiment. That is, it determines to which of the physical links constituting a logical link the received frames should be directed. The frame distributor 220 makes this selection by consulting aggregate destination management data stored as an aggregate destination management table in the aggregate destination management database 153.

The flow destination selector 121, similar to its counterpart in the first embodiment, determines to which physical link to direct each received frame, by consulting flow destination management data stored in the flow destination management database 151. This determination selects one of the physical links constituting a logical link or one of other physical links independent of any logical links (the latter group not shown in FIG. 10).

The switching processor 122 operates similarly to its counterpart in the first embodiment. That is, in response to a switchover command from the failure detector 130, the switching processor 122 changes some entries of aggregation management data from those indicating working state to those indicating backup state. Based on this new aggregation management data, the distribution destination selector 124 selects an output physical link from among those constituting the working output interface 181 and backup output interface 182. The switching processor 122 also activates the hash calculator 123 to calculate a hash from a received frame if so specified in the aggregation management data. More specifically, the switching processor 122 first extracts a frame segment out of the received frame according to a predefined frame segment designator, and then it passes the extracted segment to the hash calculator 123 to calculate a hash therefrom according to hash algorithm parameters specifying what to calculate and how. The switching processor 122 may find a hash disable flag set. If this is the case, the switching processor 122 selects an output physical link without activating the hash calculator 123.

The hash calculator 123, similar to its counterpart in the first embodiment, calculates a hash of a given frame segment by subjecting the frame to a hash function that produces as many different values as the number of physical links of the working output interface 181 and backup output interface 182.

The distribution destination selector 124, similar to its counterpart in the first embodiment, determines to which physical link to direct frames, based on the decision made by the flow destination selector 121. More specifically, the distribution destination selector 124 performs switchover from working state to backup state according to the aggregation management data. In addition, the distribution destination selector 124 consults aggregate destination management data to select an output physical link, based on a hash value calculated by the hash calculator 123.

The frame discarder 125, similar to its counterpart in the first embodiment, discards frames if so specified by a frame discard indicator in the aggregate destination management data. It is therefore possible to control the destination of output frames such that only a particular device can receive frames, or such that a particular device is prevented from receiving frames. This function of the frame discarder 125 is useful when testing the switch and another device connected thereto.

The statistical data recorder 226 has functions similar to those of the distribution destination selector 124. Specifically, the statistical data recorder 226 consults the aggregation management data stored in the aggregation management database 152 to find which physical link is used to send frames based on a hash value calculated by the hash calculator 123. Through this process, the statistical data recorder 226 collects data about the number of frames transmitted from each physical link of the working output interface 181 and backup output interface 182. The statistical data recorder 226 saves those collected data (referred to as "aggregate destination statistics") in an aggregate destination statistics database 254. In this way, the statistical data recorder 226 determines output physical links for frames in parallel with the distribution destination selector 124 and records the results of physical link selection.

The failure detector 130, similar to its counterpart in the first embodiment, detects failure of physical links of the working output interface 181 and outputs a switchover command upon detection of such failure.

The flow destination management database 151, similar to its counterpart in the first embodiment, stores flow destination management data specifying whether to direct frames to one of the physical links constituting a logical link or to one of other physical links independent of any logical links.

The aggregation management database 152, similar to its counterpart in the first embodiment, stores aggregation management data specifying whether to transmit frames from physical links of the working output interface 181 or from those of the backup output interface 182.

The aggregation management data is similar to its counterpart in the first embodiment. That is, the aggregation management data stores configuration parameters related to hash calculation of the hash calculator 123. Specifically, it provides: (a) frame segment designator specifying a frame segment that the switching processor 122 relies on to determine which physical link to use to transmit frames, (b) hash algorithm parameters specifying how to calculate a hash, (c) the number of active physical links in each of the working output interface 181 and backup output interface 182, and (d) hash disable flag indicating that no hash calculation is required. The aggregation management data further includes a frame discard indicator that indicates whether to discard frames.

The aggregate destination management database 153, similar to its counterpart in the first embodiment, stores aggregate destination management data indicating which physical link to use to transmit frames. In the aggregate destination management database 153, this aggregate destination management data is stored in the form of aggregate destination management tables 153a and 153b. The aggregate destination management data includes working physical link parameters of physical links belonging to the working output interface 181. Also included in the aggregate destination management data are backup physical link parameters of physical links belonging to the backup output interface 182. The term "physical links" refers in this context to the ports of the working output interface 181 and backup output interface 182. Yet another data included in the aggregate destination management data is a collection of hash values to be produced by the hash calculator 123. Those hash values are associated with physical links identified by working physical link parameters, as well as with those identified by backup physical link parameters.

The aggregate destination management database 153 is implemented using a dual port memory as in the first embodiment. The working and backup physical link parameters in the aggregate destination management database 153 are accessed using an index. A part of this index corresponds to individual output interfaces (i.e., working output interface 181 and backup output interface 182), while another part of the index corresponds to individual physical links.

The aggregate destination statistics database 254 stores aggregate destination statistics, or the statistical data as to the number of frames transmitted from each physical link of the working output interface 181 and backup output interface 182. Similar to the aggregate destination management database 153, the aggregate destination statistics database 254 is implemented using a dual port memory. The aggregate destination statistics in the aggregate destination statistics database 254 are accessed using an index. A part of this index corresponds to individual output interfaces (i.e., working output interface 181 and backup output interface 182), while another part of the index corresponds to individual physical links.

The working output interface 181 is formed from a subset of the physical links constituting a logical link, similarly to its counterpart in the first embodiment. The backup output interface 182, on the other hand, is formed from the whole or part of the remaining physical links constituting a logical link. The working output interface 181 has as many physical links as the backup output interface 182 has (e.g., eight links).

The communication interface 140 sends aggregate destination management data and aggregate destination statistics to a terminal (not shown), reading out them from the aggregate destination management database 153 and aggregate destination statistics database 254, respectively. As in the first embodiment, a terminal is attached to the switch of the second embodiment, so that information obtained through the communication interface 140 can be viewed on a monitor screen (not shown). This communication permits the terminal 40 to obtain aggregate destination management data and aggregate destination statistics and output the received information on its monitor screen (not shown).

FIG. 11 illustrates an example data structure of an aggregate destination statistics table according to the second embodiment. The present embodiment implements this aggregate destination statistics table 254a in such a way that working DPs and backup DPs are place in two different index spaces.

Similar to the foregoing aggregate destination management table 153b (FIG. 9), the aggregate destination statistics table 254a is stored in a dual port memory. For example, backup destination port #7 of the backup output interface 182 corresponds to the bottommost record of the illustrated aggregate destination statistics table 254a. This record is indexed by a value "0x17" in hexadecimal notation, which is obtained by concatenating an SEL field value "1" and a DP address value "7" in the aggregate destination management table 153b. It is this value that associates, in the aggregate destination statistics table 254a, a frame's output port with the number of frames sent out from that port.

The aggregate destination statistics table 254a of FIG. 11 is stored in the table memory 104 (FIG. 3), which serves as the foregoing aggregate destination statistics database 254. The aggregate destination statistics table 254a gives statistics of the number of frames sent out from each port, in which the statistical data of each working or backup logical link port is indexed by hash values of frames. When the statistical data recorder 226 writes new statistical data, the updated aggregate destination statistics table 254a is saved in the table memory 104.

As can be seen from the above description, the second embodiment provides a statistical data recorder 226 to collect statistical data about frames transmitted from the switch according to the outcomes of the switching processor 122 and hash calculator 123, together with the aggregate destination management table 153*a* (or 153*b*). The produced aggregate destination statistics table 254*a* stores data indicating the number of frames transmitted from each port. This feature makes it possible to browse how the frames are distributed to output ports, thus facilitating testing of frame distribution functions of the switch. The statistical data recorder 226 determines output physical links of frames independently of the distribution destination selector 124, thus minimizing its effect on the frame forwarding operation.

Third Embodiment

This section describes a third embodiment of the present invention. The third embodiment shares several elements with the second embodiment. The following description will focus on their differences, while affixing like reference numerals to like elements.

The third embodiment differs from the second embodiment in its frame distributor 320 and statistical data recorder 326. As in the second embodiment, this statistical data recorder 326 collects statistical data of frames transmitted from each physical link and saves their summary in an aggregate destination statistics database 254. Unlike the second embodiment, however, the statistical data recorder 326 collects such data by observing the activities of physical links.

Figure 12:
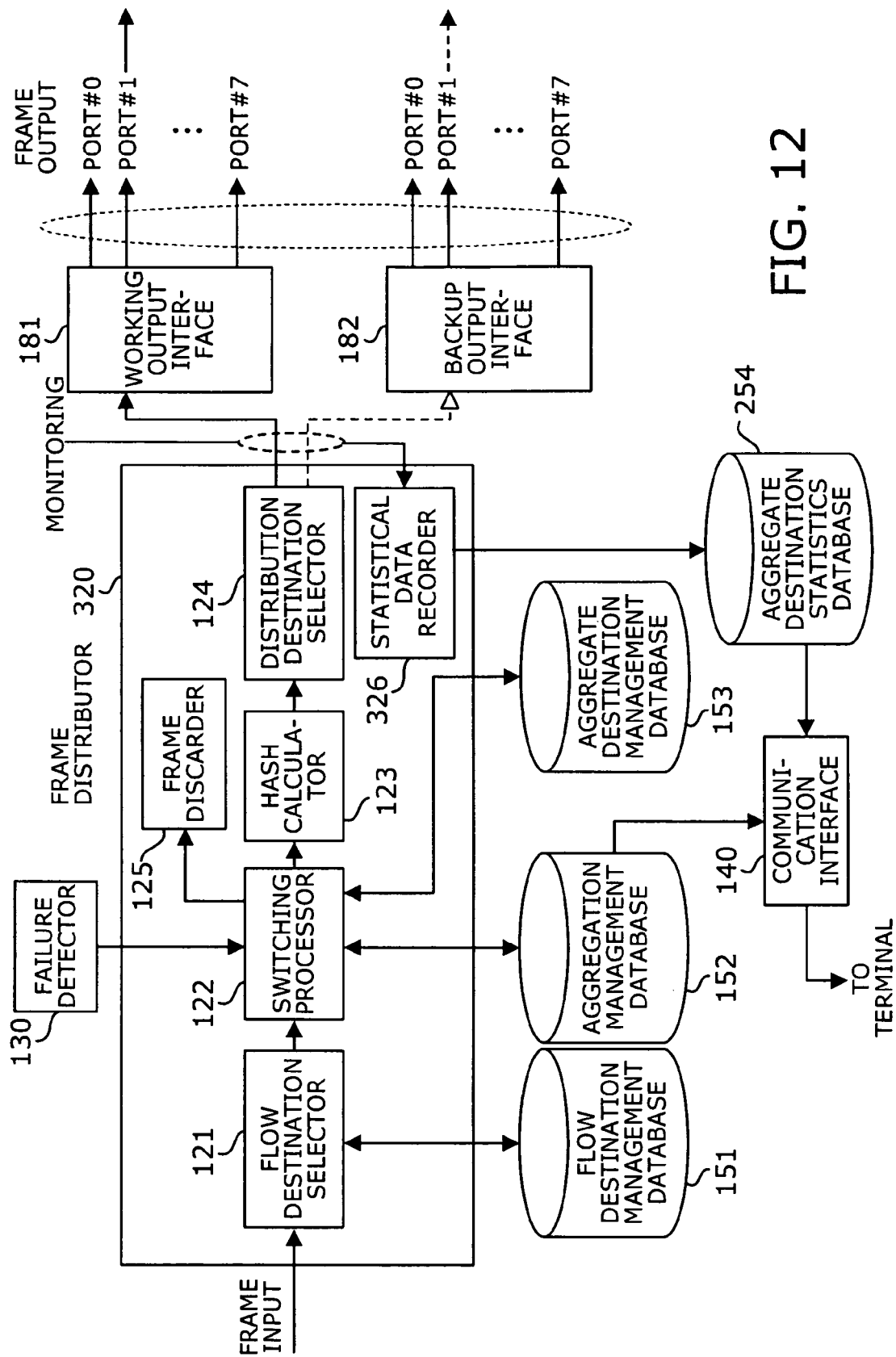
FIG. 12 is a functional block diagram of a frame distributor according to a third embodiment of the present invention.

Referring now to the block diagram of FIG. 12, the following will describe a frame distributor 220 according to the second embodiment.

The illustrated frame distributor 320 has the following elements: a flow destination selector 121, a switching processor 122, a hash calculator 123, a distribution destination selector 124, and a frame discarder 125. In addition, the frame distributor 320 has a statistical data recorder 326 to collect and summarize the statistics of frames transmitted from each physical link. While FIG. 12 does not explicitly show, the third embodiment includes a switch similar to that of the second embodiment. This switch includes the following elements: an input interface (not shown), a frame distributor 320 (already mentioned above), a failure detector 130, a communication interface 140, a flow destination management database 151, an aggregation management database 152, an aggregate destination management database 153, a working output interface 181, and a backup output interface 182. Also included is an aggregate destination statistics database 254 to store statistical records describing how many frames have been sent out of each physical link.

The input interface (not shown in FIG. 12), similar to its counterpart in the second embodiment, receives frames that arrive at the switch of the present embodiment and are supposed to be forwarded to its peer switches or other communication devices including terminals.

The frame distributor 320 operates similarly to the frame distributor 220 of the second embodiment. That is, it determines to which of the physical links constituting a logical link the received frames should be directed. The frame distributor 320 makes this selection by consulting aggregate destination management data stored as an aggregate destination management table in the aggregate destination management database 153.

The flow destination selector 121, similar to its counterpart in the second embodiment, determines to which physical link to direct each received frame, by consulting flow destination management data stored in the flow destination management database 151. This determination selects one of the physical links constituting a logical link or one of other physical links independent of any logical links (the latter group not shown in FIG. 12).

The switching processor 122 operates similarly to its counterpart in the second embodiment. That is, in response to a switchover command from the failure detector 130, the switching processor 122 changes some entries of aggregation management data from those indicating working state to those indicating backup state. Based on this new aggregation management data, the distribution destination selector 124 selects an output physical link from among those constituting the working output interface 181 and backup output interface 182. The switching processor 122 also activates the hash calculator 123 to calculate a hash from a received frame if so specified in the aggregation management data. More specifically, the switching processor 122 first extracts a frame segment out of the received frame according to a predefined frame segment designator, and then it passes the extracted segment to the hash calculator 123 to calculate a hash therefrom according to hash algorithm parameters specifying what to calculate and how. The switching processor 122 may find a hash disable flag set. If this is the case, the switching processor 122 selects an output physical link without activating the hash calculator 123.

The hash calculator 123, similar to its counterpart in the second embodiment, calculates a hash of a given frame segment by subjecting the frame to a hash function that produces as many different values as the number of physical links of the working output interface 181 and backup output interface 182.

The distribution destination selector 124, similar to its counterpart in the second embodiment, determines to which physical link to direct frames, based on the decision made by the flow destination selector 121. More specifically, the distribution destination selector 124 performs switchover from working state to backup state according to the aggregation management data. In addition, the distribution destination selector 124 consults aggregate destination management data to select an output physical link, based on a hash value calculated by the hash calculator 123.

The frame discarder 125, similar to its counterpart in the second embodiment, discards frames if so specified by a frame discard indicator in the aggregate destination management data. It is therefore possible to control the destination of output frames such that only a particular device can receive frames, or such that a particular device is prevented from receiving frames. This function of the frame discarder 125 is useful when testing the switch and another device connected thereto.

The statistical data recorder 326 observes activities of physical links of the working output interface 181 and backup output interface 182 to collect statistical data about the number of frames actually transmitted from each physical link. The statistical data recorder 326 then saves the collected data in an aggregate destination statistics database 254.

The failure detector 130, similar to its counterpart in the second embodiment, detects failure of physical links of the working output interface 181 and outputs a switchover command upon detection of such failure.

The flow destination management database 151, similar to its counterpart in the second embodiment, stores flow destination management data specifying whether to direct frames to one of the physical links constituting a logical link or to one of other physical links independent of any logical links.

The aggregation management database 152, similar to its counterpart in the second embodiment, stores aggregation management data specifying whether to transmit frames from physical links of the working output interface 181 or from those of the backup output interface 182.

The aggregation management data, similar to its counterpart in the second embodiment, stores configuration parameters related to hash calculation of the hash calculator 123. Specifically, it provides: (a) frame segment designator specifying a frame segment that the switching processor 122 relies on to determine which physical link to use to transmit frames, (b) hash algorithm parameters specifying how to calculate a hash, (c) the number of active physical links in each of the working output interface 181 and backup output interface 182, and (d) hash disable flag indicating that no hash calculation is required. The aggregation management data further includes a frame discard indicator that indicates whether to discard frames.

The aggregate destination management database 153, similar to its counterpart in the second embodiment, stores aggregate destination management data indicating which physical link to use to transmit frames. In the aggregate destination management database 153, this aggregate destination management data is stored in the form of aggregate destination management tables 153a and 153b. The aggregate destination management data includes working physical link parameters of physical links belonging to the working output interface 181. Also included in the aggregate destination management data are backup physical link parameters of physical links belonging to the backup output interface 182. The term "physical links" refers in this context to the ports of the working output interface 181 and backup output interface 182. Yet another data included in the aggregate destination management data is a collection of hash values to be produced by the hash calculator 123. Those hash values are associated with physical links identified by working physical link parameters, as well as with those identified by backup physical link parameters.

The aggregate destination management database 153 is implemented using a dual port memory as in the second embodiment. The working and backup physical link parameters in the aggregate destination management database 153 are accessed using an index. A part of this index corresponds to individual output interfaces (i.e., working output interface 181 and backup output interface 182), while another part of the index corresponds to individual physical links.

The aggregate destination statistics database 254, similar to its counterpart in the second embodiment, stores aggregate destination statistics, or the statistical data as to the number of frames transmitted from each physical link of the working output interface 181 and backup output interface 182. Similar to the aggregate destination management database 153, the aggregate destination statistics database 254 is implemented using a dual port memory. The aggregate destination statistics in the aggregate destination statistics database 254 are accessed using an index. A part of this index corresponds to individual output interfaces (i.e., working output interface 181 and backup output interface 182), while another part of the index corresponds to individual physical links.

The working output interface 181 is formed from a subset of the physical links constituting a logical link, similarly to its counterpart in the second embodiment. The backup output interface 182, on the other hand, is formed from the whole or part of the remaining physical links constituting a logical link. The working output interface 181 has as many physical links as the backup output interface 182 has (e.g., eight links).

The communication interface 140, similar to its counterpart in the second embodiment, sends aggregate destination management data and aggregate destination statistics to a terminal (not shown), reading out them from the aggregate destination management database 153 and aggregate destination statistics database 254, respectively. As in the first embodiment, a terminal is attached to the switch of the second embodiment, so that information obtained through the communication interface 140 can be viewed on a monitor screen (not shown). This communication permits the terminal 40 to obtain aggregate destination management data and aggregate destination statistics and output the received information on its monitor screen (not shown).

As can be seen from the above description, the third embodiment provides a statistical data recorder 326 designed to observe each physical link of the working output interface 181 and backup output interface 182 to collect statistical data about how many frames are transmitted from each port of the switch. The statistical data recorder 326 saves the collected data of frame distribution in an aggregate destination statistics table 254a, thus facilitating testing of frame distribution functions of the switch. What is collected by the statistical data recorder 326 is real-life data since it observes frames that are actually transmitted. The third embodiment also simplifies the mechanism required for data collection.

Fourth Embodiment

This section describes a fourth embodiment of the present invention. The fourth embodiment shares several elements with the first embodiment. The following description will focus on their differences, while affixing like reference numerals to like elements.

The fourth embodiment uses a plurality of output interfaces and assigns some of them for operating interfaces while assigning the others for standby interfaces. Frames are transmitted through physical links constituting the operating interfaces. The standby output interfaces, on the other hand, stay in standby state in normal situations. In the event of a failure of the operating output interface, the fourth embodiment replaces the failed interface, not with the whole of, but with a part of the standby interfaces, unlike the first embodiment.

Figure 13:
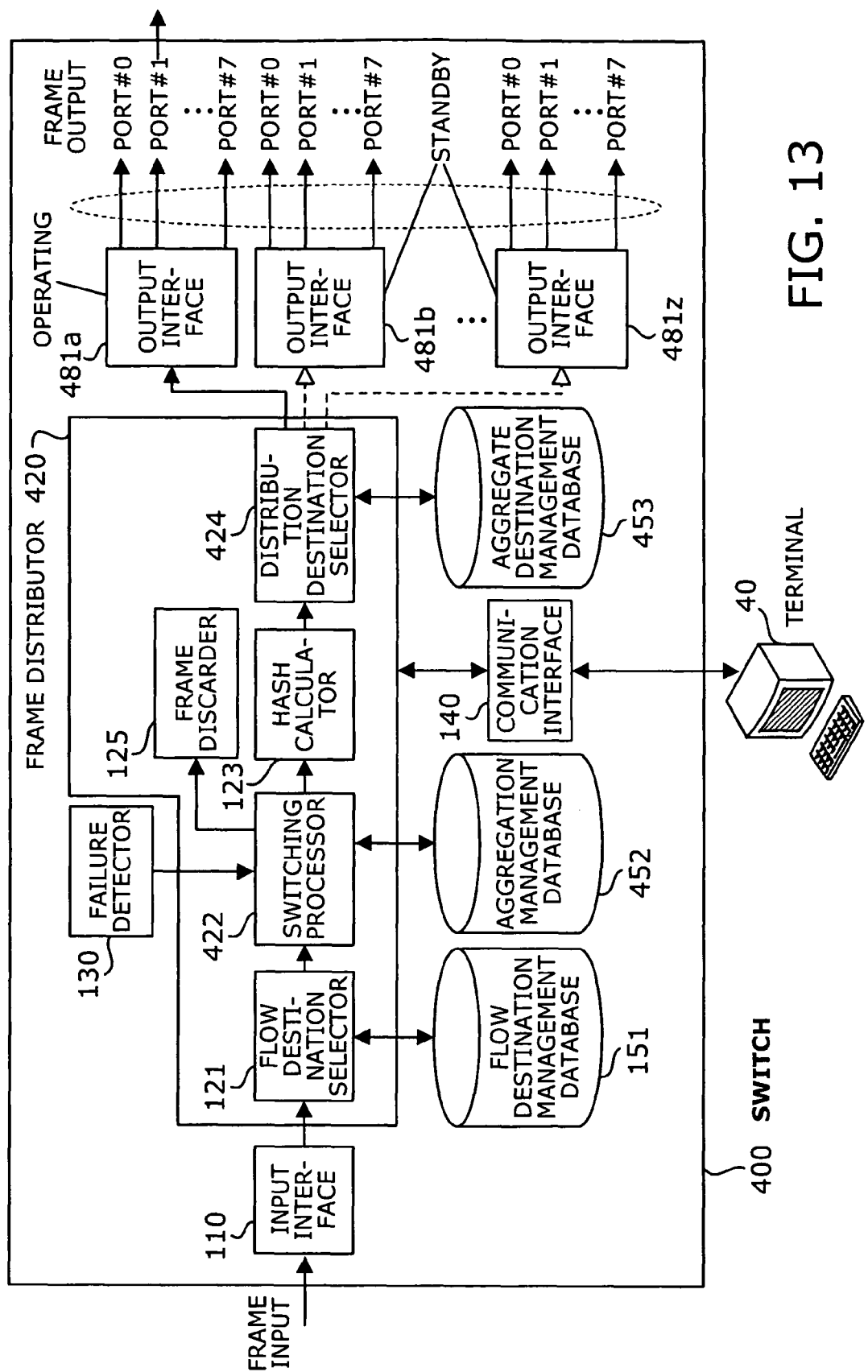
FIG. 13 is a functional block diagram of a switch according to a fourth embodiment of the present invention.

Referring now to the block diagram of FIG. 13, the following will describe a switch 400 according to the fourth embodiment.

The illustrated switch 400 has a plurality of output interfaces 481a, 481b, . . . 481z. This switch 400 serves in a communications network that uses redundancy of link aggregation architecture. According to the fourth embodiment, the switch 400 changes physical links from those of an operating output interface to those of a standby output interface in response to a switchover command. To achieve this, the proposed switch 400 has the following elements: an input interface 110, a frame distributor 420, a failure detector 130, a communication interface 140, a flow destination management database 151, an aggregation management database 452, and an aggregate destination management database 453. Further, the frame distributor 420 is formed from the following elements: a flow destination selector 121, a switching processor 422, a hash calculator 123, a distribution destination selector 424, and a frame discarder 125.

As mentioned above, one of the output interfaces serves as an "operating output interface" to output frames. The remaining output interfaces are "standby output interfaces" which are ready to operate, but not supplied with outgoing frames for transmission at the moment. Those standby output interfaces stay in this standby state until the operating output interface encounters a failure.

The term "working output interface" will be used to refer to an output interface that is supposed to be the operating output interface in its default state and during normal conditions. The term "backup output interface" will be used to refer to an output interface that is supposed to be a standby output interface in its default state and during normal conditions.

The input interface 110, similar to its counterpart in the first embodiment, receives frames that arrive at the switch 400 of the present embodiment and are supposed to be forwarded to peer switches or other communication devices including terminals.

The frame distributor 420 selects physical links of one of the output interfaces 481a, 481b, . . . 481z to transmit frames. When a switchover command is received, the frame distributor 420 performs switchover from the current physical links to other physical links belonging to a different output interface. For this operation, the frame distributor 420 consults aggregate destination management data stored as an aggregate destination management table in the aggregate destination management database 453.

The failure detector 130 detects a failure in the logical link between the switch 400 and other switch. If a failure is found, the failure detector 130 sends a switchover command to the switching processor 422 in the frame distributor 420. As a result of switchover operation by the frame distributor 420, the flow of frames is switched from the operating output interface 481a to another output interface (e.g., 481b) that has been on standby. Accordingly, the standby output interface 481b begins to transmit frames and continues to do so as a new operating output interface.

The frame distributor 420 may also initiate switchover based on the number of active physical links available for use. Specifically, the frame distributor 420 replaces the current operating output interface 481a with a standby output interface in the case where the number of physical links identified by active physical link parameters is insufficient with respect to a required bandwidth specified by a bandwidth parameter. Outgoing frames transmitted from the switch 400 need a specific amount of network bandwidth depending on their destinations. This bandwidth requirement is specified by bandwidth parameters stored in the switch 400's memory (not shown in FIG. 13).

The flow destination selector 121, similar to its counterpart in the first embodiment, determines to which physical link to direct each received frame, by consulting flow destination management data stored in the flow destination management database 151. This determination selects one of the physical links constituting a logical link or one of other physical links independent of any logical links (the latter group not shown in FIG. 13).

When a switchover command is received from the failure detector 130, the switching processor 422 selects at least one of the standby output interfaces 481b, . . . 481z as a new operating output interface, while sending the original operating output interface 481a to standby state. In addition to that, the switching processor 422 updates the aggregation management data in the aggregation management database 452 to reflect the new setup of the output interfaces. Consulting the updated aggregation management data, the distribution destination selector 424 selects which physical link to use to transmit frames, from among those belonging to the selected output interface(s) 481b, . . . 481z. This mechanism realizes N:1 card redundancy, or the system with one operating interface card and N standby interface cards.

As in the first embodiment, the switching processor 422 also activates the hash calculator 123 to calculate a hash from a received frame if so specified in the aggregation management data. More specifically, the switching processor 422 first extracts a frame segment out of the received frame according to a predefined frame segment designator, and then it passes the extracted segment to the hash calculator 123 to calculate a hash therefrom according to hash algorithm parameters specifying what to calculate and how. The switching processor 422 may find a hash disable flag set. If this is the case, the switching processor 122 selects an output physical link without activating the hash calculator 123.

The hash calculator 123 calculates a hash of a given frame segment by subjecting the frame to a hash function that produces as many different values as the number of physical links of each output interface 481a, 481b, . . . 481z.

For use in transmitting frames, the distribution destination selector 424 initially selects physical links belonging to the operating output interface 481a. In the event of a failure in a physical link of the operating output interface, the distribution destination selector 424 selects physical links of a new operating output interface 481b, . . . 481z. Here the distribution destination selector 424 consults the aggregation management data stored in the aggregation management database 452 to determine which output interface to use to transmit a frame, as well as looking up the aggregate destination management data to determine which physical link to use, based on a hash value calculated by the hash calculator 123 for that frame.

The frame discarder 125, similar to its counterpart in the first embodiment, discards frames if so specified by a frame discard indicator in the aggregate destination management data. It is therefore possible to control the destination of output frames such that only a particular device can receive frames, or such that a particular device is prevented from receiving frames. This function of the frame discarder 125 is useful when testing the switch and another device connected thereto.

The failure detector 130 detects a failure of physical links of the working output interface 481a and outputs a switchover command upon detection of such a failure.

The flow destination management database 151, similar to its counterpart in the first embodiment, stores flow destination management data specifying whether to direct frames to one of the physical links constituting a logical link or to one of other physical links independent of any logical links.

The aggregation management database 452 stores aggregation management data specifying which of the output interfaces 481a, 481b, . . . 481z is the current operating output interface.

The aggregation management data also includes several configuration parameters related to hash calculation of the hash calculator 123. Specifically, it provides: (a) frame segment designator specifying a frame segment that the switching processor 422 relies on to determine which physical link to use to transmit frames, (b) hash algorithm parameters specifying how to calculate a hash, (c) the number of active physical links in each of the output interfaces 481a, 481b, . . . 481z, and (d) hash disable flag indicating that no hash calculation is required. The aggregation management data further includes a frame discard indicator that indicates whether to discard frames.

The aggregate destination management database 453, similar to the aggregate destination management database 153 in the first embodiment, stores aggregate destination management data indicating which physical link to use to transmit frames. In the aggregate destination management database 453, this aggregate destination management data is stored in the form of aggregate destination management tables 453a and 453b (details described later in FIGS. 15 and 16). The aggregate destination management data includes physical link parameters of physical links belonging to each output interface 481a, 481b, . . . 481z. The term "physical links" refers in this context to the ports of each output interface 481a, 481b, . . . 481z (e.g., port #0 to port #7). Yet another data included in the aggregate destination management data is a collection of hash values to be produced by the hash calculator 123. Those hash values are associated with physical links of the output interfaces 481a, 481b, . . . 481z, which are identified by the physical link parameters.

The aggregate destination management database 453 is implemented using a dual port memory. The working and backup physical link parameters in the aggregate destination management database 453 are accessed using an index. A part of this index corresponds to individual output interfaces 481a, 481b, . . . 481z, while another part of the index corresponds to individual physical links belonging to those output interfaces.

The output interfaces 481a, 481b, . . . 481z offer multiple sets of physical links that constitute different portions of a logical link. The output interfaces 481a, 481b, . . . 481z have the same number of physical links (e.g., eight links). One of those output interfaces 481a, 481b, . . . 481z is designated as an operating output interface for transmitting frames, whereas the other output interfaces are designated as standby output interfaces. For example, one output interface 481a serves as an operating output interface to transmit frames, and the remaining output interfaces 481b, . . . 481z are on standby, i.e., ready for immediate use.

As in the first embodiment, a terminal 40 is attached to the switch 400 of the fourth embodiment, so that information obtained from the switch 400 can be viewed on a monitor screen (not shown). The switch 400 contains a communication interface 140 to communicate with the terminal 40. This communication permits the terminal 40 to obtain aggregate destination management data and aggregate destination statistics and output the received information on its monitor screen (not shown).

Similar to the switch 100 of the first embodiment, a plurality of interface cards are installed in the switch 400. All those interface cards are equivalent in their communication functions and thus capable of both receiving and sending frames. The switch 400 uses one interface card as an input card to receive frames and other interface cards as output cards to send frames. The input card functions as the input interface 110, frame distributor 420, failure detector 130, while the output cards function as output interfaces 481a, 481b, . . . 481z. With those cards, the switch 400 receives and forwards frames to peer switches and the like.

For another possible setup of redundancy, the switching processor 422 according to the present embodiment may configure the output interfaces as follows. That is, the switching processor 422 may designate one of the output interfaces (e.g., 481z) as a standby output interface, and the rest of them (e.g., 481a, 481b, . . . ) as operating output interfaces. Upon receipt of a switchover command requesting replacement of a particular output interface (e.g., 481a), the switching processor 422 modifies aggregation management data in the aggregation management database 452 such that the standby output interface 481z will be used in place of the specified operating output interface 481a. In this case, the distribution destination selector 424 selects an output physical link from among the physical links of the operating output interfaces (i.e., those other than the output interface 481z). In the event of a failure, the distribution destination selector 424 changes the selection to a physical link of the standby output interface 481z according to the aggregation management data in the aggregation management database 452. This setup realizes 1:N card redundancy, or the system with many operating interface cards and one standby interface card.

FIG. 14 illustrates an example data structure of an aggregation management table according to the fourth embodiment. The illustrated aggregation management table 452a is stored in the table memory 104 (FIG. 3), which serves as the aggregation management database 452. The aggregation management table 452a, similar to the foregoing aggregation management table 152a of FIG. 7, is used to determine which logical link to use to transmit frames. For this purpose, the aggregation management table 452a has the following data fields:
 V field
 LAG NUMBER field
 SEL field
 NH field
 HT field
 HR field
 WORKING AP field
 (N−1) BACKUP AP fields (BACKUP AP 1, BACKUP AP 2, . . . BACKUP AP N−1)
The field values arranged in a row constitute a single set of associated parameters.

According to the present embodiment, the SEL field indicates whether the output logical link is a working link or one of a plurality of backup links. Specifically, SEL=0 indicates that the frames are sent over a working logical link. The working logical link has to be switched to a backup logical link when it encounters a failure. If this is the case, the SEL field is changed from zero to other number representing a specific backup logical link. The new SEL takes a value ranging from 1 to N−1, which identifies a backup logical link.

Figure 16:
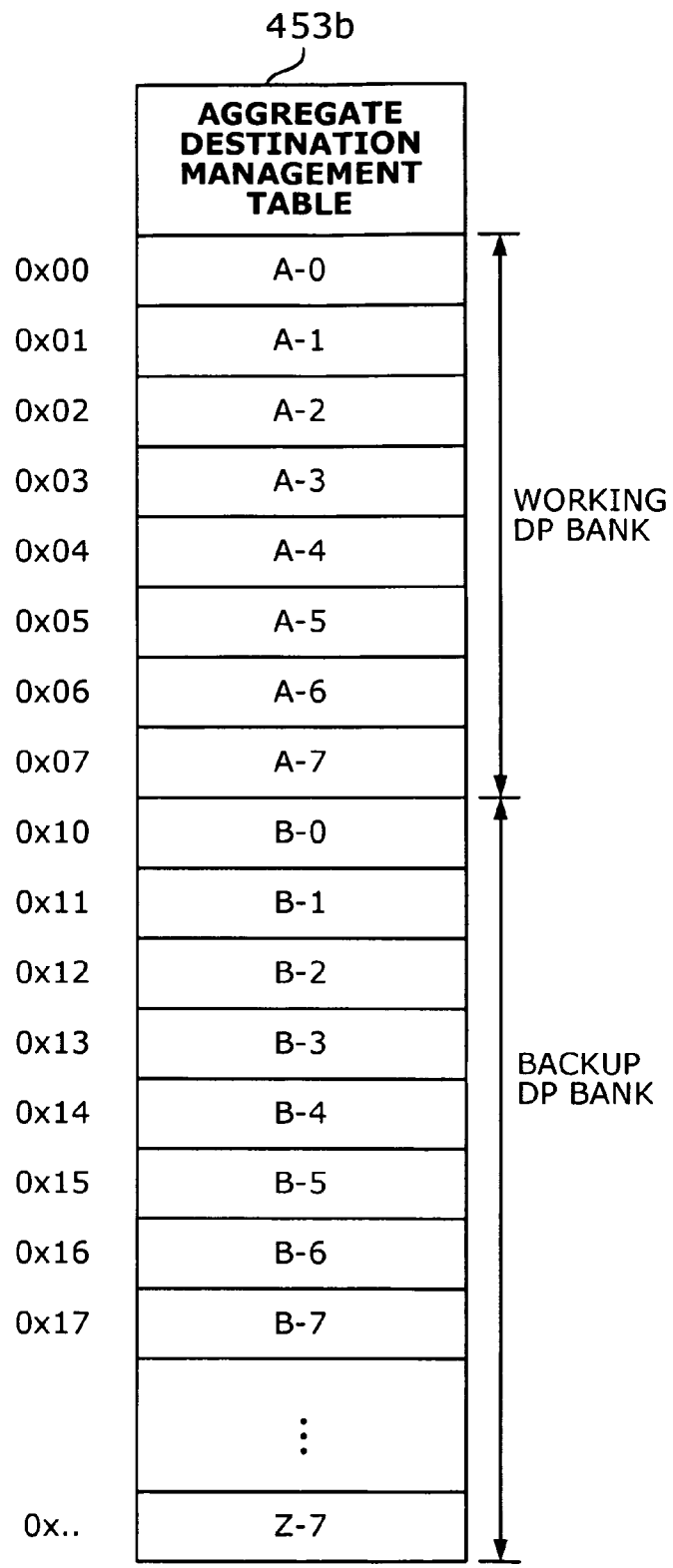
FIG. 16 illustrates an example data structure of an aggregate destination management table according to a variation of the fourth embodiment.

As mentioned, the aggregation management table 452a of the present embodiment provides a plurality of BACKUP AP fields corresponding to different backup logical links to indicate the number of active ports available for use. When the hash calculation is disabled (i.e., NH=1), each BACKUP AP field contains a value that specifies an output port of the corresponding backup logical link. Basically the BACKUP AP fields give the number of active ports available at that moment for use in the backup logical link. In the case of NH=1, the BACKUP AP fields contain the HV field value of a corresponding entry of the aggregate destination management table 453a (FIG. 15). This HV field value is equal to the index (or address) of a corresponding entry of the aggregate destination management table 453b (FIG. 16).

The above-described aggregation management table 452a is saved in the table memory 104 according to console commands given by an operator who manages the switch 400, similarly to the aggregation management table 152a in the first embodiment. Some values in the aggregation management table 452a may vary with changes in the number of active ports of the operating output interface providing a logical link.

FIG. 15 illustrates an example data structure of an aggregate destination management table according to the fourth embodiment. The illustrated aggregate destination management table 453b is stored in the table memory 104 (FIG. 3), which serves as the foregoing aggregate destination management database 453. This aggregate destination management table 453a, similar to the foregoing aggregate destination management table 153a shown in FIG. 8, is used to determine which destination port of a logical link to select to transfer frames. For this purpose, the aggregate destination management table 453a is formed from the following data fields:
 HV field
 WORKING DP field
 (N−1) BACKUP DP field (e.g., BACKUP DP 1, BACKUP DP 2, . . . BACKUP DP N−1)

The field values arranged in a row constitute a single set of associated parameters.

The aggregate destination management table 453a provides multiple BACKUP DP fields, each of which contains unique identifiers of each destination port of each backup logical link. The aggregate destination management table 453a is saved in the table memory 104 according to console commands given by an operator who manages the switch 400.

As can be seen from the above description, the fourth embodiment enables many output interfaces to form a link aggregation group. With its increased redundancy, this feature enhances the reliability to switches.

Variation of Fourth Embodiment

This section describes a variation of the fourth embodiment of the present invention. This variation shares several elements with the original fourth embodiment. The following description will focus on their differences, while affixing like reference numerals to like elements. Briefly, the switch of this variation is characterized by another version of an aggregate destination management table 453b, which contains arrays of working DPs and (N−1) sets of backup DPs that can be looked up by using different index values, unlike the original fourth embodiment.

One arrangement of working DPs and backup DPs in an aggregate destination management table is to place them in adjacent two columns, such that both DPs can be looked up by using a common index. While this arrangement saves storage space, the table memory may experience an access conflict. When the switch is operating with a working interface, the aggregate destination management table receives constant access to handle incoming frames. If, in this situation, a configuration frame arrives to change some backup DP definitions or other configuration parameters, then the resulting table access may conflict with those of ordinary incoming packets. To handle such simultaneous access properly, it is necessary to implement an arbitration function into the circuit. This brings more complexity to the circuit design and thus leads to an increased equipment cost.

FIG. 16 illustrates an example data structure of an aggregate destination management table according to a variation of the fourth embodiment. This modified version of the fourth embodiment uses an aggregate destination management table 453b that arranges working DPs and (N−1) sets of backup DPs in different index spaces. Each area is indexed by a bit string obtained by concatenating an SEL field value of the aggregation management table 452a (FIG. 14) with a hash value calculated according to that table.

The aggregate destination management table 453b is stored in a dual port memory. Port #7 of the backup output interface 481b is found at index "0x17" (hexadecimal) of the illustrated aggregate destination management table 453b. The index value "0x17" is obtained by concatenating an SEL field value "1" and a DP address value "7." It is this value that associates, in the aggregate destination management table 453b, the hash value of a frame with the output port used to transmit it.

The aggregate destination management table 453b of FIG. 16 is stored in the table memory 104 (FIG. 3). This aggregate destination management table 453b, similar to the foregoing aggregate destination management table 453a shown in FIG. 15, is used to determine which destination port of a logical link to select to transfer frames. The aggregate destination management table 453b stores a list of identifiers that uniquely identify each destination port belonging to a working or backup logical link, the list being indexed by hash values of frames. The aggregate destination management table 453b is saved in the table memory 104 (FIG. 3) according to console commands given by an operator who manages the switch 400.

As can be seen from the above description, this variation of the fourth embodiment offers an aggregate destination management table 453a in which working DPs and backup DPs are arranged in separate memory areas. This design makes it possible to set up or reconfigure a backup interface in standby state while allowing the working interface to transfer frames, without causing access conflicts.

Fifth Embodiment

This section describes a fifth embodiment of the present invention. The fifth embodiment shares several elements with the foregoing second and fourth embodiments. The following description will focus on their differences, while affixing like reference numerals to like elements.

Figure 17:
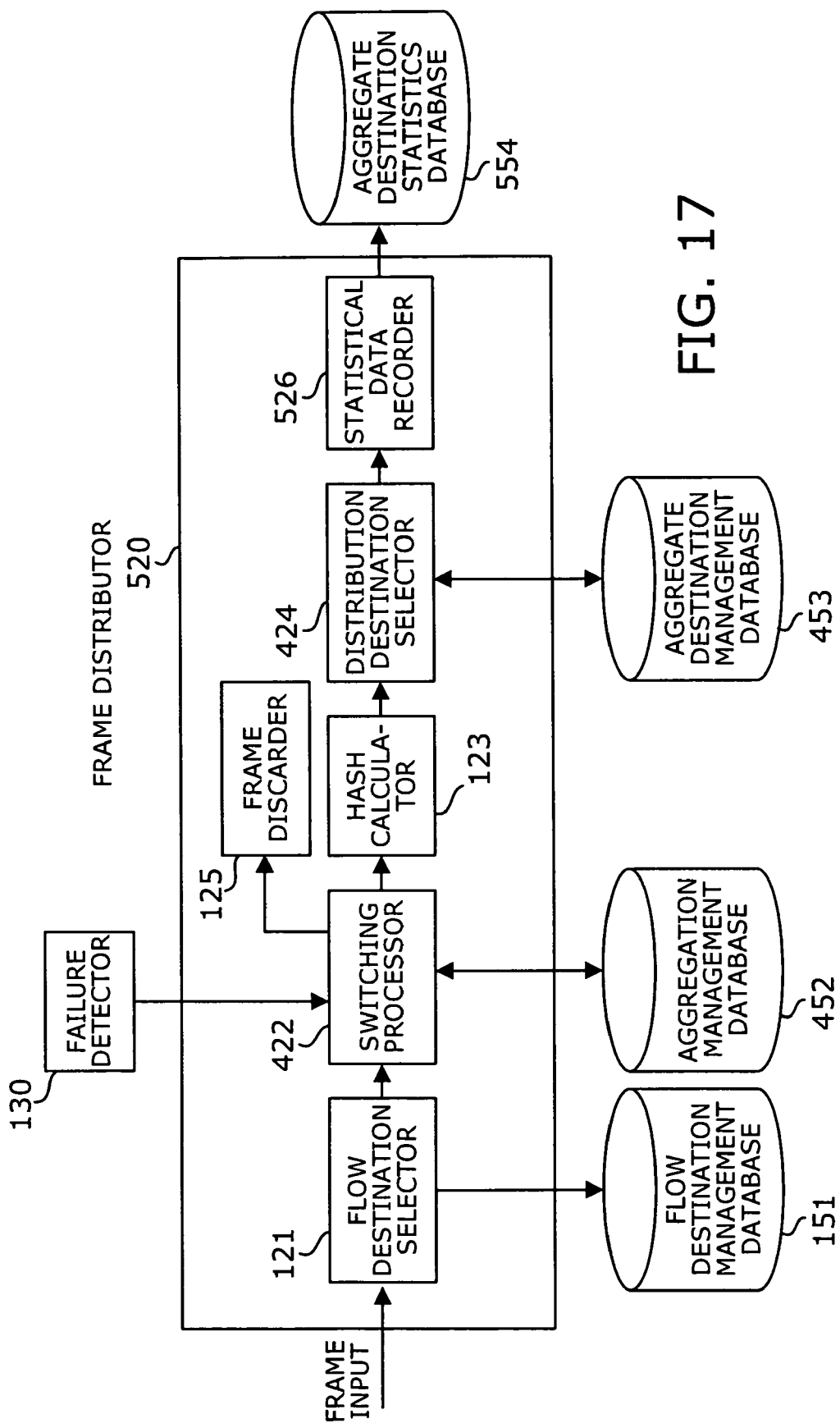
FIG. 17 is a functional block diagram of a frame distributor according to a fifth embodiment of the present invention.

Unlike the two embodiments mentioned above, the fifth embodiment has no output interfaces. Instead of outputting frames to physical links, the fifth embodiment records the selection results of those physical links as statistical data of the switch's frame distribution operation. Referring now to the block diagram of FIG. 17, the following will describe a frame distributor 520 according to the fifth embodiment.

The illustrated frame distributor 520 has the following elements: a flow destination selector 121, a switching processor 422, a hash calculator 123, a distribution destination selector 424, and a frame discarder 125. In addition, the frame distributor 520 has a statistical data recorder 526 to collect and summarize the statistics of frames to be transmitted from each physical link. While FIG. 17 does not explicitly show, the fifth embodiment includes a switch similar to other embodiments. This switch includes the following elements: an input interface (not shown), a frame distributor 520 (already mentioned above), a failure detector 130, a communication interface (not shown), a flow destination management database 151, an aggregation management database 452, an aggregate destination management database 453. Also included is an aggregate destination statistics database 554 to store statistical records describing how many frames would be sent out of each physical link (if physical links were present).

The switch of the present embodiment is different from the fourth embodiment in its lack of output interfaces 481a, 481b, . . . 481x. While such physical interfaces are not present, the present embodiment assumes the presence of imaginary output interfaces with, for example, eight ports, similar to the real ones. In fact, those output interfaces exist only in the database.

The input interface 110, similar to its counterpart in the fourth embodiment, receives frames that arrive at the switch of the present embodiment and are supposed to be forwarded to peer switches or other communication devices including terminals.

The frame distributor 520 selects physical links of one of the output interfaces to transmit frames, similarly to its counterpart in the fourth embodiment. When a switchover command is received, the frame distributor 520 performs switchover from the current physical links to other physical links belonging to another output interface. For this operation, the frame distributor 520 consults aggregate destination management data stored as an aggregate destination management table in the aggregate destination management database 453.

The above switchover command is issued by the failure detector 130 when it has detected a simulated failure in a logical link between the present switch and other switch. The switchover command is directed to the switching processor 422 in the frame distributor 520. As a result of switchover operation by the frame distributor 520, the flow of frames is switched from the then operating output interface to one of the standby output interfaces. The selected standby output interface now begins to transmit frames and continues to do so as a new operating output interface.

The frame distributor 520 may also initiate switchover based on the number of active physical links available for use. Specifically, the frame distributor 520 replaces the current operating output interface with a standby output interface in the case where the number of physical links identified by active physical link parameters is insufficient with respect to a required bandwidth specified by a bandwidth parameter. Outgoing frames transmitted from the switch need a specific amount of network bandwidth depending on their destinations. This bandwidth requirement is specified by bandwidth parameters stored in the switch's memory (not shown in FIG. 17).

The flow destination selector 121, similar to its counterpart in the fourth embodiment, determines to which physical link to direct each received frame, by consulting flow destination management data stored in the flow destination management database 151. This determination selects one of the physical links (not shown) constituting a logical link or one of other physical links (not shown) independent of any logical links.

Similar to its counterpart in the fourth embodiment, the switching processor 422 selects at least one of the standby output interfaces as a new operating output interface, while sending the original operating output interface to standby state, in response to a switchover command from the failure detector 130. In addition to that, the switching processor 422 updates the aggregation management data in the aggregation management database 452 to reflect the new setup of output interfaces. Based on the updated aggregation management data, the statistical data recorder 526 determines which physical link to use to transmit frames, from among those belonging to the selected output interface(s).

As in the fourth embodiment, the switching processor 422 also activates the hash calculator 123 to calculate a hash from a received frame if so specified in the aggregation management data. More specifically, the switching processor 422 first extracts a frame segment out of the received frame according to a predefined frame segment designator, and then it passes the extracted segment to the hash calculator 123 to calculate a hash therefrom according to hash algorithm parameters specifying what to calculate and how. The switching processor 422 may find a hash disable flag set. If this is the case, the switching processor 422 selects an output physical link without activating the hash calculator 123.

The hash calculator 123 calculates a hash of a given frame segment by subjecting the frame to a hash function that produces as many different values as the number of physical links of each output interface.

The distribution destination selector 424 selects an output physical link from among the physical links of the operating output interface. In the event of a failure, the distribution destination selector 424 changes the selection to a physical link of the standby output interface according to aggregation management data stored in the aggregation management database 452.

Here the distribution destination selector 424 executes switchover of output interfaces by consulting the aggregation management data, as well as consulting the aggregate destination management data to determine output physical links based on a hash value calculated by the hash calculator 123.

The distribution destination selector 424 then informs the statistical data recorder 526 of those decisions. Based on this information, the statistical data recorder 526 collects data about the number of frames transmitted from each determined physical link.

The frame discarder 125, similar to its counterpart in the fourth embodiment, discards frames if so specified by a frame discard indicator in the aggregate destination management data. This function is useful when testing the switch since the destination of frames can be controlled such that only a particular device can receive frames, or such that a particular device is prevented from receiving frames.

The statistical data recorder 526 receives information about decisions made by the distribution destination selector 424, thus collecting data about the number of frames transmitted from each physical link. The statistical data recorder 526 then saves the collected data in an aggregate destination statistics database 554.

The failure detector 130 simulates a failure of physical links, thus outputting a switchover command to the switching processor 422.

The flow destination management database 151, similar to its counterpart in the fourth embodiment, stores flow destination management data specifying whether to direct frames to one of the physical links constituting a logical link or to one of other physical links independent of any logical links.

The aggregation management database 452, similar to its counterpart in the fourth embodiment, stores aggregation management data specifying which of the output interfaces is the current operating output interface.

The aggregation management data, similar to its counterpart in the fourth embodiment, stores configuration parameters related to hash calculation of the hash calculator 123. Specifically, it provides: (a) frame segment designator specifying a frame segment that the switching processor 422 relies on to determine which physical link to use to transmit frames, (b) hash algorithm parameters specifying how to calculate a hash, (c) the number of active physical links in each of the output interfaces, and (d) hash disable flag indicating that no hash calculation is required. The aggregation management data further includes a frame discard indicator that indicates whether to discard frames.

The aggregate destination management database 453, similar to its counterpart in the fourth embodiment, stores aggregate destination management data indicating which physical link to use to transmit frames. In the aggregate destination management database 453, this aggregate destination management data is stored in the form of aggregate destination management tables 453a and 453b. The aggregate destination management data includes physical link parameters of physical links belonging to each output interface. The term "physical links" refers in this context to the ports of each output interface. Also included in the aggregate destination management data is a set of hash values to be produced by the hash calculator 123, which are associated with physical links identified by the physical link parameters.

The aggregate destination management database 453 is implemented using a dual port memory as in the fourth embodiment. The working and backup physical link parameters in the aggregate destination management database 453 are accessed using an index. A part of this index corresponds to individual output interfaces, while another part of the index corresponds to individual physical links.

The aggregate destination statistics database 554, similar to the aggregate destination statistics database 254 in the second embodiment, stores aggregate destination statistics, or a collection of statistical data as to the number of frames transmitted from each physical link of each output interface. Similar to the aggregate destination management database 453, the aggregate destination statistics database 554 is implemented using a dual port memory. The aggregate destination statistics in the aggregate destination statistics database 554 are accessed using an index. A part of this index corresponds to individual output interfaces, while another part of the index corresponds to individual physical links.

The output interfaces offer multiple sets of physical links that constitute different portions of a logical link. It is assumed that the output interfaces have the same number of physical links (e.g., eight links). One of those output interfaces is designated as an operating output interface to transmit frames, whereas the other output interfaces stay in a standby state, but ready for immediate use.

The fifth embodiment includes a communication interface (not shown), similar to its counterpart in the second embodiment, to send aggregate destination management data and aggregate destination statistics to a terminal (not shown), reading out them from the aggregate destination management database 453 and aggregate destination statistics database 554, respectively. As in the fourth embodiment, the terminal is attached to the switch of the fifth embodiment, so that information obtained through the communication interface can be viewed on a monitor screen (not shown). This communication permits the terminal to obtain aggregate destination management data and aggregate destination statistics and output the received information on its monitor screen (not shown).

Figure 18:
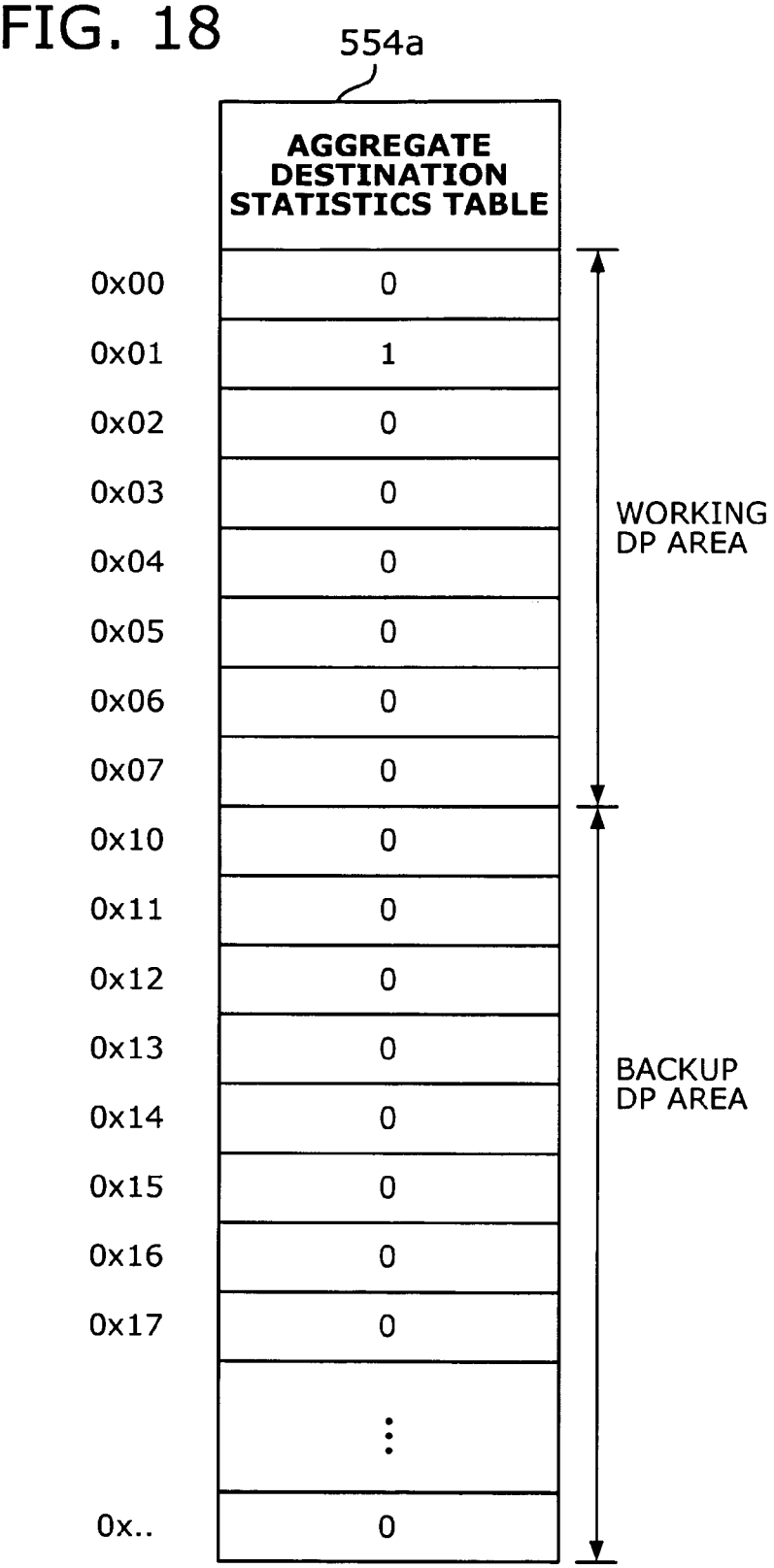
FIG. 18 illustrates an example data structure of an aggregate destination statistics table according to the fifth embodiment.

FIG. 18 illustrates an example data structure of an aggregate destination statistics table according to the fifth embodiment. The present embodiment implements this aggregate destination statistics table 554a in such a way that working DPs and (N−1) sets of backup DPs are placed in two different index spaces.

Similar to the foregoing aggregate destination statistics table 254a (FIG. 11), the aggregate destination statistics table 554a is stored in a dual port memory. For example, destination port #7 of the working output interface is found at the eighth-to-the-top record of the illustrated aggregate destination statistics table 554a. This record is indexed by a value "0x07" in hexadecimal notation, which is obtained by concatenating an SEL field value "0" with a DP address value "7." It is this value that associates, in the aggregate destination statistics table 554a, a frame's output port with the number of frames sent out from that port.

The aggregate destination statistics table 554a of FIG. 18 is stored in the table memory 104 (FIG. 3), which serves as the foregoing aggregate destination statistics database 554. The aggregate destination statistics table 554a illustrates the statistics of the number of frames sent out from each port of working or backup logical links, in which the statistical data of each working or backup logical link port is indexed by hash values of frames. When the statistical data recorder 526 writes new statistical data, the updated aggregate destination statistics table 554a is saved in the table memory 104.

As can be seen from the above description, the fifth embodiment provides an aggregate destination statistics table 554a containing a collection of statistical data about the number of frames transmitted from each port. This feature makes it possible to browse how the frames are distributed to output ports, thus facilitating testing of frame distribution functions of the switch. The fifth embodiment enables this feature with a single interface card for receiving frames, eliminating output interfaces.

Sixth Embodiment

This section describes a sixth embodiment of the present invention. The sixth embodiment shares several elements with the first embodiment. The following description will focus on their differences, while affixing like reference numerals to like elements.

Figure 19:
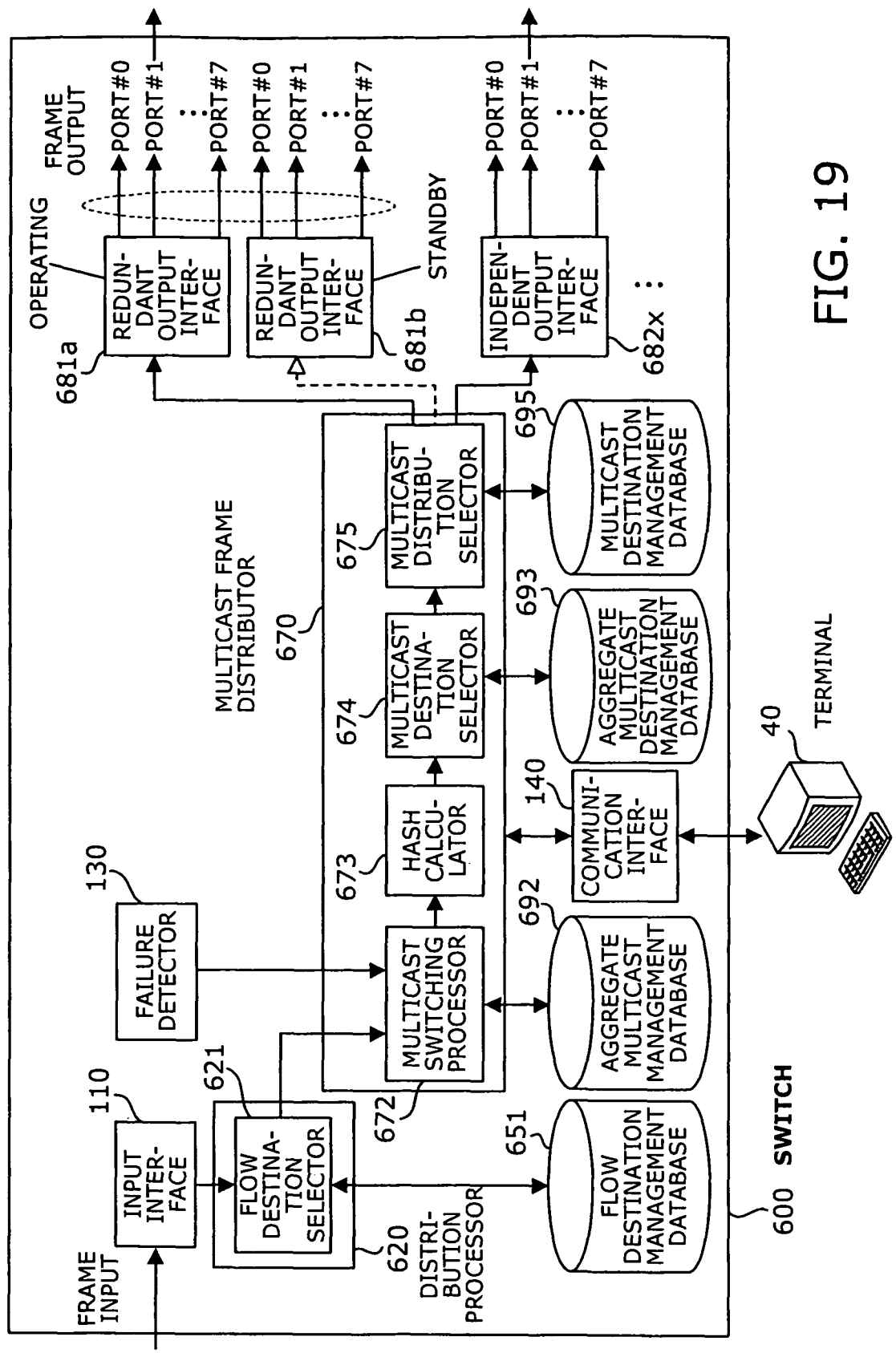
FIG. 19 is a functional block diagram of a switch according to a sixth embodiment of the present invention.

Briefly, the sixth embodiment differs from the first embodiment in that a logical link using link aggregation allows, not only a unicast flow of frames, but also a multicast flow of frames. Referring now to the block diagram of FIG. 19, the following will describe a switch 600 according to the sixth embodiment.

According to the sixth embodiment, the switch 600 performs multicast transmission of frames to a redundant logical link using link aggregation and non-redundant physical links. For this purpose, the illustrated switch 600 includes the following elements: an input interface 110, a frame distributor 620, a failure detector 130, a communication interface 140, a flow destination management database 651, an aggregate multicast management database 692, an aggregate multicast destination management database 693, a multicast destination management database 695, two redundant output interfaces 681a and 681b, and a plurality of independent output interfaces 682x . . . . Further, the frame distributor 620 contains a flow destination selector 621, and the multicast frame distributor 670 has a multicast switching processor 672, a hash calculator 673, a multicast destination selector 674, and a multicast distribution selector 675.

While details are not shown or described, the switch 600 of the sixth embodiment has the functions corresponding to those described in the first embodiment (FIG. 5) as the aggregation management database 152, aggregate destination management database 153, and frame distributor 120 including a flow destination selector 121, switching processor 122, hash calculator 123, and distribution destination selector 124. With those elements, the switch 600 transfers frames through a logical link formed from redundant output interfaces 681a and 681b.

The input interface 110, similar to its counterpart in the first embodiment, receives frames that arrive at the switch 600 of the present embodiment and are supposed to be forwarded to peer switches or other communication devices including terminals.

The flow destination selector 621 in the proposed frame distributor 620 determines whether to use unicast or multicast to transmit the received frames by consulting flow destination management data stored in the flow destination management database 651. The unicast in this case means transmitting frames solely through the logical link formed from redundant output interfaces 681a and 681b. By contrast, the multicast means transmitting frames using not only that logical link, but also the independent output interface 682x and the like, which provide non-redundant physical links.

Multicast frames are usually distinguished by their MAC address (FIG. 4) with the most significant bit set to one. According to the present embodiment, the flow destination management data is provided in the form of a flow destination management table 651a including entries corresponding to such multicast MAC addresses. The flow destination selector 621 can determine the destination of multicast frames by using those entries of the flow destination management table 651a.

As will be described in detail later with reference to FIG. 20, the flow destination management table 651a has, among others, "L" and "DESTINATION" fields corresponding to different destination MAC address values of frames. For the frames to be transmitted via a logical link (or logical link group, LAG), the L field is set to one to indicate that its corresponding DESTINATION field contains a logical link identifier. Following this convention, the flow destination selector 621 selects a specified logical link as the destination of a received frame if the L field corresponding to the frame's destination MAC address contains a value of one. Note that the flow destination management table 651a may optionally be indexed by VLAN tag values (see FIG. 4), instead of destination MAC address.

As discussed in the first embodiment, since both the destination MAC address and VLAN tag have many digits, the flow destination management table 651a would consume a large memory space if those values were used to index it. It is therefore preferable to use CAM, rather than standard SRAM or DRAM, for the flow destination management table 651a.

The frame distributor 620 operates similarly to the frame distributor 120 of the first embodiment. Briefly, the frame distributor 620 selects physical links to transmit frames, and when a switchover command is received, it performs switchover from the current physical links to other physical links. For this operation, the frame distributor 620 consults aggregate destination management data stored as an aggregate destination management table stored in an aggregate destination management database (not shown). A switchover command is produced by the failure detector 130 upon detection of a failure in the logical link between the switch 600 and other switch. The command is sent to a switching processor (not shown) in the frame distributor 620, thus causing switch over from the current operating output interface to a standby output interface.

In the case where a switchover command is received from the failure detector 130, the multicast switching processor 672 performs switchover from the operating output interface to a standby output interface selected from among the group of redundant output interfaces. The selected standby output interface (e.g., redundant output interface 681b) begins serving as a new operating output interface, while the previous operating output interface (e.g., redundant output interface 681a) is sent to a standby state. The multicast switching processor 672 then updates the aggregate multicast management data in the aggregate multicast management database 692 to reflect the new roles of those redundant output interfaces. Consulting the updated aggregation management data, the distribution destination selector 424 selects which physical link to use to transmit frames, from among those belonging to the selected standby output interface (i.e., redundant output interface 681b).

The multicast switching processor 672 also activates the hash calculator 673 to calculate a hash from a received frame if so specified in the aggregate multicast management data. More specifically, the multicast switching processor 672 first extracts a frame segment out of the received frame according to a predefined frame segment designator, and then it passes the extracted segment to the hash calculator 673 to calculate a hash therefrom according to hash algorithm parameters specifying what to calculate and how. The multicast switching processor 672 may find a hash disable flag set. If this is the case, multicast switching processor 672 selects an output physical link without activating the hash calculator 673.

The hash calculator 673 calculates a hash of a given frame segment by subjecting the frame to a hash function that produces as many different values as the number of physical links of each output interface (i.e., redundant output interfaces 681a and 681b and independent output interfaces 682x, . . . ).

The multicast destination selector 674 makes a decision about switching, by consulting aggregate multicast management data stored in the aggregate multicast management database 692. That is, the multicast destination selector 674 determines whether to use the working physical link parameters or the backup physical link parameters to select a pattern of output physical links for a given frame.

For use as a logical-link for outgoing frames, the multicast destination selector 674 initially selects, for example, a redundant output interface 681a designated as an operating output interface. In the event of a failure in a physical link of the operating output interface, the multicast destination selector 674 consults aggregate multicast destination management data stored in the aggregate multicast destination management database 693 to change output physical links from the current operating output interface (i.e., redundant output interface 681a) to a standby output interface (e.g., redundant output interface 681b).

The multicast destination selector 674 consults aggregate multicast destination management data stored in the aggregate multicast destination management database 693 so as to select either (a) a pattern of the working physical link parameters that is corresponding to the hash value calculated by the hash calculator 673 or (b) a pattern of the backup physical link parameters that is corresponding to the hash value calculated by the hash calculator 673, according to the foregoing decision made with reference to the aggregate multicast management data.

Through the above process, the multicast destination selector 674 executes switchover of redundant output interfaces by consulting aggregate multicast management data, as well as determining output physical links based on hash values calculated by the hash calculator 673 by consulting aggregate multicast destination management data.

The multicast distribution selector 675 consults multicast destination management data stored in the multicast destination management database 695 to select output physical links based on hash values calculated by the hash calculator 673.

The failure detector 130 detects a failure in physical links of the redundant output interface 681a and outputs a switchover command upon detection of such a failure.

The flow destination management database 651 stores flow destination management data specifying whether to use unicast or multicast to transmit frames, as well as indicating where to direct them.

The aggregate multicast management database 692 stores aggregate multicast management data that specifies which physical links to use to transmit frames, out of those constituting the redundant output interfaces 681a and 681b and independent output interfaces 682x and the like. This aggregate multicast management data also includes several configuration parameters related to hash calculation of the hash calculator 673. Specifically, it provides: (a) frame segment designator specifying a frame segment that the multicast switching processor 672 relies on to determine which physical links to select to multicast frames, (b) hash algorithm parameters specifying how to calculate a hash, (c) the number of active physical links available in each redundant output interface 681a and 681b, and (d) hash disable flag indicating that no hash calculation is required.

The aggregate multicast destination management database 693 stores aggregate multicast destination management data in the form of an aggregate multicast destination management table 693a (details described later in FIG. 22). This aggregate multicast destination management data contains physical link parameters of physical links belonging to the redundant output interface 681a and 681b and independent output interfaces 682x and the like. The term "physical links" refers in this context to the ports of each output interface (e.g., port #0 to port #7). Yet another data included in the aggregate multicast destination management data is a collection of hash values to be produced by the hash calculator 673. Those hash values are associated with patterns of working physical link parameters, as well as with those of backup physical link parameters.

The aggregate multicast destination management database 693 is implemented using a dual port memory, similar to the aggregate destination management database 153 of the first embodiment.

The multicast destination management database 695 stores multicast destination management data specifying which physical links to use to output frames, out of those constituting a logical link or those independent of any logical links. More specifically, the multicast destination management data is formed from: (a) a plurality of working physical link parameters defining patterns of output physical links selected from among working physical links of the redundant output interfaces 681a and 681b and non-redundant physical links of the independent output interfaces 682x and so on, and (b) a plurality of backup physical link parameters defining patterns of output physical links selected from among backup physical links of the redundant output interfaces 681a and 681b and non-redundant physical links of the independent output interfaces 682x and so on. The multicast destination management data associates patterns determined by the multicast destination selector 674 with each physical link.

The redundant output interfaces 681a and 681b offer physical links constituting a logical link, which are divided into working physical links and backup physical links. The former group is used to transmit frames. The latter group stays in a standby state, ready for transmitting frames if required. The independent output interfaces 682x, . . . offer non-redundant physical links, which are independent of any logical link. Those output interfaces have the same number of physical links (e.g., eight links).

One of the two redundant output interfaces 681a and 681b serves as an operating output interface, which is supposed to transmit frames. For example, the redundant output interface 681a plays this role. The other redundant output interface (e.g., 681b) serves as a backup output interface, which stays in a standby state, ready for transmitting frames if required. The independent output interfaces 682x, . . . offer multiple physical links, which do not constitute logical links, but operate individually.

The multicast distribution selector 675 determines destination ports of a multicast frame by consulting multicast destination management data. When their ports are specified as destination ports, the redundant output interface 681a and 681b and independent output interface 682x, . . . transmit copies of the frame from those ports.

As in the first embodiment, a terminal 40 is attached to the switch 600 of the sixth embodiment, so that information obtained from the switch 600 can be viewed on a monitor screen (not shown). The switch 600 contains a communication interface 140 to communicate with the terminal 40. This communication permits the terminal 40 to obtain aggregate destination management data and aggregate destination statistics and output the received information on its monitor screen (not shown).

Similar to the switch 100 of the first embodiment, a plurality of interface cards are installed in the switch 600. All those interface cards are equivalent in their communication functions and thus capable of both receiving and sending frames. The switch 600 uses one interface card as an input card to receive frames and other interface cards as output cards to send frames. The input card functions as the input interface 110, frame distributor 620, multicast frame distributor 670, failure detector 130. On the other hand, the output cards function as redundant output interface 681a, 681b, independent output interface 682x and the like. With those cards, the switch 600 receives and forwards frames to peer switches and the like.

FIG. 20 illustrates an example data structure of a flow destination management table according to sixth embodiment. This flow destination management table 651a is stored in the foregoing table memory 104 (FIG. 3), which serves as the flow destination management database 651. The flow destination management table 651a indicates whether to use unicast or multicast to transmit a frame, as well as whether the output link of a frame is part of a logical link. For this purpose, the flow destination management table 651a has L, M, and DESTINATION fields.

Briefly, the L field indicates whether the destination port of a frame is part of a logical link, and the M field indicates whether the frame is to be unicast or multicast. The DESTINATION field indicates where to direct the frame. The field values arranged in a row constitute a single set of associated parameters.

More specifically, the L field is set to zero when the destination port is not a logical link, and to one when it is. The M field is set to zero for unicast frames and one for multicast frames. The DESTINATION field contains a specific LAG number (described later in FIG. 21) when the destination port is a logical link port. When the destination port of a frame is not a logical link port, the DESTINATION field contains a combination of destination card name and port number that specify which port of which interface card is to transmit the frame.

The above-described flow destination management table 651a is saved in the table memory 104 (FIG. 3) according to console commands given by an operator who manages the switch 600.

FIG. 21 illustrates an example data structure of an aggregate multicast management table according to the sixth embodiment. This aggregate multicast management table 692a is stored in the foregoing table memory 104 (FIG. 3), which serves as an aggregate multicast management database 692. The aggregate multicast management table 692a is used to determine which logical link to use to multicast frames. For this purpose, the aggregate multicast management table 692a has the following data fields:

LAG (link aggregation group) number field
SEL (selector) field
NH (no hash) field
HT (hash target) field
HR (hash rule) field
WORKING AP (active port) field
BACKUP AP field The field values arranged in a row constitute a single set of associated parameters.

The LAG NUMBER field contains an LAG number used to distribute frames to aggregated links. LAG numbers are used to extract a specific pattern of frame distribution using link aggregation from among those predefined in the aggregate multicast management table 692a.

The SEL field indicates whether the output logical link of frames is a working link or a backup link. Specifically, SEL=0 indicates that the frames are sent over a working logical link (e.g., link of redundant output interface 681a). The working logical link has to be switched to a backup logical link when it encounters a failure. If this is the case, the SEL field is changed from zero to one.

The NH field specifies whether to calculate hashes for frame distribution. Specifically, NH=0 enables hash calculation, while NH=1 disables hash calculation.

The HT field specifies which part of a frame is subjected to hash calculation if it is enabled (i.e., NH=0). Specifically, HT=0 means that a hash is calculated from MAC address field of a given frame. HT=1 means that a hash is calculated from VLAN ID field of a given frame. HT=2 means that a hash is calculated from IP address field of a given frame.

The HR field specifies a specific algorithm of hash calculation. Specifically, HR=0 indicates that a hash is obtained as the remainder of division of the hash target value by the number of active ports (described later). HR=1 indicates that a hash is obtained as the remainder of division of the hash target value by a predefined generator polynomial.

The WORKING AP field indicates the number of active ports available for use in a logical link provided by the working redundant output interface. When the hash calculation is disabled (i.e., NH=1), the WORKING AP field contains a value that specifies an output port of the working logical link. Basically the WORKING AP field gives the number of active ports available at that moment for use in the working logical link. In the case of NH=1, the WORKING AP field contains the HV field value of a corresponding entry of the aggregate multicast destination management table 693a (FIG. 22).

The BACKUP AP field indicates the number of active ports available for use in the backup logical link. When the hash calculation is disabled (i.e., NH=1), the BACKUP AP field contains a value that specifies an output port of the backup logical link. Basically the BACKUP AP field gives the number of active ports available at the moment for use in the backup logical link. In the case of NH=1, the BACKUP AP field contains the HV field value of a corresponding entry of the aggregate multicast destination management table 693a (FIG. 22).

The above-described aggregate multicast management table 692a is saved in the table memory 104 (FIG. 3) according to console commands given by an operator who manages the switch 600, similarly to the aggregation management table 152a in the first embodiment. Some values in the aggregate multicast management table 692a may vary with changes in the number of active ports of the operating output interface providing a logical link.

FIG. 22 illustrates an example data structure of an aggregate multicast destination management table according to the sixth embodiment. This aggregate multicast destination management table 693a is stored in the foregoing table memory 104 (FIG. 3), which serves as an aggregate multicast destination management database 693. The aggregate multicast destination management table 693a is supposed to give a pattern of destination ports to which frames will be directed in the case where the multicast destination management table 695a (FIG. 23) specifies multicast transmission for those frames. For this purpose, the illustrated aggregate multicast destination management table 693a has the following data fields:

HV (hash value) field
WORKING MID (multicast ID) field
BACKUP MID field

The field values arranged in a row constitute a single set of associated parameters.

The HV field contains values that associates hash values identifying each frame with their corresponding output ports. The WORKING MID field contains unique identifiers identifying each pattern of destination ports to which frames will be directed in the case of multicast transmission using a logical link of the working output interface. The BACKUP MID field contains unique identifiers identifying each pattern of destination ports to which frames will be directed in the case of multicast transmission using a logical link of a backup output interface. The above MIDs and their corresponding destination port patterns are given by a multicast destination management table 695a as will be described below with reference to FIG. 23.

The above-described aggregate multicast destination management table 693a is saved in the table memory 104 (FIG. 3) according to console commands given by an operator who manages the switch 600.

FIG. 23 illustrates an example data structure of a multicast destination management table according to the sixth embodiment. This multicast destination management table 695a is stored in the foregoing table memory 104 (FIG. 3), which serves as a multicast destination management database 695. The multicast destination management table 695a gives various pattern of destination ports to which frames will be directed in the case of multicast transmission. For this purpose, the multicast destination management table 695a has an "MID" field and a plurality of destination port fields ("A-0" to "Z-7" in FIG. 23), the latter fields corresponding to the ports of redundant output interfaces 681a and 681b and independent output interfaces 682x and so on. The field values arranged in a row constitute a single set of associated parameters.

Specifically, the destination port fields define various patterns of destination ports to which frames will be directed in the case of multicast transmission. The MID field contains unique identifiers identifying each of those destination port patterns. When multicasting a frame, the multicast distribution selector 675 first retrieves a specific MID value from WORKING MID field or BACKUP MID field of the foregoing aggregate multicast destination management table 693a and then looks up the multicast destination management table 695a with the retrieved MID value, thereby retrieving a corresponding destination port pattern.

While the redundant output interfaces 681a and 681b and independent output interface 682x and so on provide many ports, the retrieved destination port pattern specifies a particular combination of those ports for use in transmitting the frame of interest. More specifically, the destination port field takes a value of one for the specified destination ports, and zero for non-destination ports.

The above-described multicast destination management table 695a is saved in the table memory 104 (FIG. 3) according to console commands given by an operator who manages the switch 600.

As can be seen from the above description, the multicast frame distributor 670 provides a multicast flow of frames to both the logical and physical links in a hybrid network system formed from non-redundant physical links and redundant logical links using link aggregation. In other words, the sixth embodiment of the invention makes it possible to build a communication system with redundant logical links using link aggregation to transfer both unicast and multicast flows of frames with a high availability. While the above description of the sixth embodiment has assumed an application to layer-2 switches, the embodiment should not be limited to that specific application. Rather, the sixth embodiment can be used in any other communication apparatuses with a function of forwarding frames, such as routers operating in a layer higher than the data link layer.

CONCLUSION

The foregoing embodiments are applicable to communication systems for transferring frames using a redundant logical link formed by aggregating a plurality of physical links. The proposed communication apparatus and method enable instant switchover from working links to backup links in the event of a failure of a working link.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication apparatus comprising:
an input interface to receive a multicast frame addressed to a plurality of destinations;
a first output interface comprising a plurality of redundant output interfaces that provide working physical links for transmitting frames and standby physical links staying on standby while being ready to transmit frames, the working and standby physical links being configurable to provide a logical link formed from an aggregation of physical links connected to a single destination;
a second output interface to provide a plurality of non-redundant physical links respectively connected to different destination terminal devices;
an aggregate multicast destination management database storing aggregate multicast destination management data which comprises:
a plurality of working physical link parameters each corresponding to a pattern of output physical links selected from among the working physical links of the first output interface and the non-redundant physical links of the second output interface, and
a plurality of backup physical link parameters each corresponding to a pattern of output physical links selected from among the backup physical links of the first output interface and the non-redundant physical links of the second output interface;
a multicast destination selector that consults the aggregate multicast destination management data stored in the aggregate multicast destination management database to select one of the working or backup physical link parameters which corresponds to a specified part of the received multicast frame;
a multicast destination management database storing multicast destination management data describing the patterns of the output physical links which correspond to the working and backup physical link parameters; and
a multicast distribution selector that consults the multicast destination management data stored in the multicast destination management database to determine one of the patterns of the output physical links for use in transmitting the received multicast frame, according to said one of the working or backup physical link parameters that is selected by the multicast destination selector.

2. The communication apparatus according to claim 1, wherein:
the communication apparatus further comprises:
an aggregate multicast management database storing aggregate multicast management data that specifies whether to use the working physical link parameters or the backup physical link parameters for communication over the logical link, and
a hash calculator that calculates a hash value of the received multicast frame by subjecting the specified part of the received multicast frame to a hash function;
the multicast destination selector consults the aggregate multicast management data stored in the aggregate multicast management database to make a decision about whether to use the working physical link parameters or the backup physical link parameters; and
the multicast destination selector selects said one of the working or backup physical link parameters that corresponds to the calculated hash value.

3. The communication apparatus according to claim 2, wherein:
the aggregate multicast management data comprises a frame segment designator that specifies which part of a frame should be subjected to the hash function; and
the communication apparatus further comprises a multicast switching processor that extracts a segment of the received multicast frame as specified by the frame segment designator, for use by the hash calculator to calculate the hash of the received frame.

4. The communication apparatus according to claim 2, wherein:
the aggregate multicast management data comprises a hash algorithm parameter specifying an algorithm of calculating a hash; and
the communication apparatus further comprises a multicast switching processor that causes the hash calculator to use the algorithm specified by the hash algorithm parameter.

5. The communication apparatus according to claim 2, wherein:
the aggregate multicast management data comprises a hash disable flag for disabling the hash calculator; and
the communication apparatus further comprises a multicast switching processor that determines the output physical links for use in transmitting the received multicast frame while disabling the hash calculator when the hash disable flag is set.

6. The communication apparatus according to claim 1, further comprising:
a flow destination management database storing flow destination management data that specifies whether to use unicast or multicast to transmit frames, as well as indicating where to direct the frames; and
a frame distributor comprising a flow destination selector that consults the flow destination management data stored in the flow destination management database to determine whether to use the unicast or multicast to transmit the frames.

7. A communication apparatus for transferring frames using a logical link formed by aggregating a plurality of physical links, the communication apparatus comprising:
an input interface that receives frames;
a multicast destination management database storing multicast destination management data specifying which physical links to use to transmit the frames, from among those constituting a logical link or those not involved in any logical links;
a multicast frame distributor that consults the multicast destination management data to select physical links for transmitting the frame received by the input interface;
a plurality of redundant output interfaces that provide working physical links for transmitting frames and standby physical links staying on standby while being ready to transmit frames, the working and standby physical links constituting a logical link;
at least one independent output interface to provide non-redundant physical links independent of any logical links;

an aggregate multicast destination management database storing aggregate multicast destination management data comprising:
- a plurality of working physical link parameters defining, for each different hash value, a pattern of output physical links selected from among the working physical links of the redundant output interfaces and the non-redundant physical links of the independent output interface, and
- a plurality of backup physical link parameters defining, for each different hash value, a pattern of output physical links selected from among the backup physical links of the redundant output interfaces and the non-redundant physical links of the independent output interface;

an aggregate multicast management database storing aggregate multicast management data that specifies which physical links to use to transmit frames, from among those of the redundant output interfaces and independent output interfaces;

a hash calculator, provided as part of the multicast frame distributor, that calculates a hash of the received frame by subjecting a specified part of the frame to a hash function;

a multicast destination selector, provided as part of the multicast frame distributor, that consults the aggregate multicast management data stored in the aggregate multicast management database to make a decision about whether to use the working physical link parameters or the backup physical link parameters to select a pattern of the output physical links for the received frame, and then consults the aggregate multicast destination management data stored in the aggregate multicast destination management database so as to select either a pattern of the working physical link parameters that is corresponding to the calculated hash value or a pattern of the backup physical link parameters that is corresponding to the calculated hash value, according to the decision made with reference to the aggregate multicast management data; and a multicast distribution selector, provided as part of the multicast frame distributor, that consults the multicast destination management data stored in the multicast destination management database so as to determine the output physical links for use in transmitting the received frame according to the pattern selected by the multicast destination selector.

* * * * *